United States Patent

Kawatsu

[11] Patent Number: 5,885,727
[45] Date of Patent: Mar. 23, 1999

[54] FUEL CELL-BASED GENERATOR SYSTEM AND METHOD OF THE SAME

[75] Inventor: Shigeyuki Kawatsu, Susono, Japan

[73] Assignee: Toyota Jidosha Kabushiki Kaisha, Toyota, Japan

[21] Appl. No.: 862,257

[22] Filed: May 23, 1997

[30] Foreign Application Priority Data

May 30, 1996 [JP] Japan .................................. 8-161010

[51] Int. Cl.$^6$ ............................................. H01M 8/04
[52] U.S. Cl. .............................. 429/17; 429/20; 429/24; 429/26
[58] Field of Search ................. 429/20, 24, 26, 429/17

[56] References Cited

U.S. PATENT DOCUMENTS 5,449,568  9/1995  Micheli et al. ......................... 429/20
5,677,073  10/1997  Kawatsu .

FOREIGN PATENT DOCUMENTS 55-21587  2/1980  Japan .
5-21079   1/1993  Japan .

OTHER PUBLICATIONS

Patent Abstracts of Japan, Oct. 27, 1998, JP 05021079, Jan. 29, 1993.

Primary Examiner—Maria Nuzzolillo
Assistant Examiner—Monique M. Wills
Attorney, Agent, or Firm—Oblon, Spivak, McClelland, Maier, & Neustadt, P.C.

[57] ABSTRACT

The present invention provides a fuel cell-based generator system that prevents a catalyst in fuel cells from being poisoned and a potential on oxygen electrodes of the fuel cells from lowering, while improving the energy efficiency. While $I_2$ is fed from a halogen tank 41 to a preliminary reaction tank 30 via a first conduit 33, $H_2O$ is fed from a water tank 43 to the preliminary reaction tank 30 via a second conduit 34. The preliminary reaction tank 30 is heated by the heat transmitted from a stack of fuel cells FC, and the reaction expressed as $H_2O+I_2 \rightarrow 2HI+(\frac{1}{2})O_2$ occurs in the preliminary reaction tank 30. HI produced by the above reaction is dissolved in excess $H_2O$ and fed into a reaction tank 50 via a fourth conduit 36. The reaction tank 50 is heated by the heat transmitted from the stack of fuel cells FC, and the reaction expressed as $2HI \rightarrow H_2+I2$ occurs in the reaction tank 50. The gaseous mixture of $H_2$ and $I_2$ is flown into a hydrogen purifier 60 via a sixth conduit 54. The hydrogen purifier 60 separates gaseous hydrogen $H_2$ from the gaseous mixture. The gaseous hydrogen $H_2$ is then fed into flows paths of gaseous hydrogen in the stack of fuel cells FC.

22 Claims, 21 Drawing Sheets

FUEL CELL-BASED GENERATOR SYSTEM AND METHOD OF THE SAME

BACKGROUND OF THE INVENTION

1. Field of the Invention

The present invention relates to a fuel cell-based generator having a gas generator for producing a reaction gas containing hydrogen and fuel cells that receive a supply of the reaction gas from the gas generator, and a method of generating electricity with the fuel cells.

2. Description of the Related Art

Fuel cells are a known device for directly converting the chemical energy of a fuel to electrical energy. Each fuel cell generally includes an electrolyte membrane interposed between a pair of electrodes. The surface of one electrode is exposed to a hydrogen-containing gaseous fuel, while the surface of the other electrode is exposed to an oxygen-containing gas. The fuel cell utilizes the electrochemical reactions occurring on these electrodes and takes electrical energy out of the electrodes.

A known gas generator for producing a gaseous fuel supplied to the fuel cell is a reformer that reforms methanol to steam (for example, JAPANESE PATENT LAID-OPEN GAZETTE No. 5-21079). Steam reforming of methanol in the reformer is carried out through the following chemical reactions:

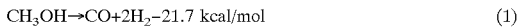

$$CH_3OH \rightarrow CO+2H_2-21.7 \text{ kcal/mol} \quad (1)$$

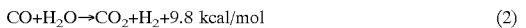

$$CO+H_2O \rightarrow CO_2+H_2+9.8 \text{ kcal/mol} \quad (2)$$

$$CH_3OH+H_2O \rightarrow CO_2+3H_2-11.9 \text{ kcal/mol} \quad (3)$$

As clearly understood from the equation (3) representing the reforming reaction, the reaction products by steam reforming are theoretically only hydrogen and carbon dioxide at the molar ratio of 3:1. In the actual state, however, the reaction does not proceed 100% ideally, and carbon monoxide as a by-product and non-reacted methanol exist after the reaction.

In the fuel cells, carbon monoxide is adsorbed by platinum or a platinum alloy, which functions as a catalyst on the electrode for receiving the gaseous fuel, thereby deteriorating the catalytic function of platinum. This phenomenon is generally referred to as poisoning of the catalyst. Methanol, on the other hand, passes through the electrolyte membrane and reaches the other electrode to react with oxygen included in the oxygen-containing gas, thereby lowering the potential on the oxygen electrode. Methanol also deteriorates durability of pipes constituting a flow path of gaseous fuel.

In known fuel cell-based generator systems, the utilization ratio of the gaseous fuel in the fuel cells is limited to 60 to 80%, in order to minimize the problems due to carbon monoxide and methanol. The problem of poor energy efficiency accordingly arises in such known fuel cell-based generator systems.

SUMMARY OF THE INVENTION

The object of the present invention is thus to provide a fuel cell-based generator system that prevents a catalyst in fuel cells from being poisoned and a potential on oxygen electrodes of the fuel cells from lowering, while improving the energy efficiency.

At least part of the above and the other related objects is realized by a fuel cell-based generator system comprising: gas producing means comprising heating means for generating heat; and a reaction tank for reserving a halohydric acid and a catalyst for accelerating decomposition of the halohydric acid, the reaction tank producing the hydrogen-containing reaction gas by thermal decomposition that occurs with the heat from the heating means; a fuel cell comprising a pair of electrodes with a catalyst carried thereon, to which a supply of the hydrogen-containing reaction gas is fed, the fuel cell generating an electromotive force through an electrochemical reaction of the reaction gas; and a reaction gas supply conduit for feeding the reaction gas produced by the gas producing means to the fuel cell. The fuel cell-based generator system thus constructed is hereinafter referred to as the fuel cell-based generator system of the basic structure.

In the fuel cell-based generator system of the basic structure, when the reaction tank is heated by the heating means, thermal decomposition occurs in the presence of the catalyst for accelerating decomposition of the halohydric acid, so as to produce hydrogen from the halohydric acid. The halohydric acid here represents a solution of hydrogen halide. Hydrogen is supplied to the fuel cell as a reaction gas. The thermal decomposition produces only hydrogen in principle, and does not yield any undesirable by-products that deteriorate the cell function, such as carbon monoxide and methanol. This structure can solve the problems of poisoning the catalyst in the fuel cell and lowering the potential on the oxygen electrode. No yield of by-products enables the 100% utilization of gaseous hydrogen in the fuel cell, thereby enhancing the energy efficiency.

It is preferable that the fuel cell-based generator system of the basic structure further comprises heat transmission means for transmitting heat generated by the fuel cell to the heating means. The fuel cell-based generator system having this preferable structure is hereinafter referred to as the fuel cell-based generator system of the second structure.

In the fuel cell-based generator system of the second structure, the heating means heats the reaction tank by utilizing the heat generated by the fuel cell. No additional heating means, such as an electric heater, is accordingly required for heating the reaction tank. This reduces the required number of parts and simplifies the structure of the whole fuel cell-based generator system, while having a favorable effect on energy efficiency. The amount of heat produced by the fuel cell is varied with a variation in amount of electricity generated by the fuel cell. This structure enables an autonomous feedback control of the amount of the reaction gas produced by the gas producing means, based on the amount of electricity generated by the fuel cell.

In accordance with one preferable application of the present invention, in the fuel cell-based generator system of the second structure, the fuel cell is driven at a temperature higher than temperature of the thermal decomposition occurring in the reaction tank. The fuel cell-based generator system further comprises a cooling water flow path arranged around the fuel cell, cooling water being passed through the cooling water flow path. The heat transmission means comprises circulation means connected to the cooling water flow path for circulating the cooling water between the cooling water flow path and the heating means.

This structure enables the operation temperature of the fuel cell to be higher than the temperature of the thermal decomposition occurring in the reaction tank. Cooling water running through the cooling water flow path arranged around the fuel cell is fed to the heating means. The reaction tank is thus sufficiently heated by the hot exhaust from the fuel cells. This structure utilizes the existing constituent, that is, the cooling water flow path generally arranged around the fuel cell, thereby further simplifying the structure of the whole fuel cell-based generator system.

In accordance with another preferable application of the present invention, in the fuel cell-based generator system of the second structure, the fuel cell is driven at a temperature lower than temperature of the thermal decomposition occurring in the reaction tank. The heat transmission means comprises temperature increasing means for increasing temperature of the heat generated by the fuel cell to be higher than the temperature of the thermal decomposition.

Although the operation temperature of the fuel cell is lower than the temperature of the thermal decomposition, the temperature increasing means increases the temperature of the heat discharged from the fuel cell and transmitted to the heating means to be higher than the temperature of the thermal decomposition. This enables the reaction tank to be sufficiently heated by the heat from the fuel cell, thereby enhancing the energy efficiency.

The fuel cell-based generator system of this preferable structure may further comprise a cooling water flow path arranged around the fuel cell, cooling water being flown through the cooling water flow path. In this case, the heat transmission means further comprises: a first flow path connected to the cooling water flow path for making the cooling water passed to the heating means via the temperature increasing means when the fuel cell is in operation; a second flow path bypassing the temperature increasing means for making the cooling water passed through the cooling water flow path to the heating means; detection means for detecting that the fuel cell is at a stop; and control means for , when the detection means detects that the fuel cell is at a stop, deactivating the first flow path and activating the second flow path.

When the detection means detects that the fuel cell is at a stop, the control means activates the second flow path, in order to enable cooling water to be directly passed to the heating means via the second flow path. The cooling water of the fuel cell bypasses the temperature increasing means and is directly supplied to the heating means, while the fuel cell is at a stop. The temperature of the cooling water is lower than the temperature of the thermal decomposition occurring in the reaction tank, so that the reaction tank is cooled down by the cooling water and production of the reaction gas by the gas producing means is stopped swiftly. This structure enables production of the reaction gas by the gas producing means to be stopped without much delay at the time of stopping operation of the fuel cell, while allowing the reaction tank to be heated by the heat from the fuel cell.

In accordance with still another preferable application of the present invention, in the fuel cell-based generator system of the second structure, the fuel cell is driven at a temperature lower than temperature of the thermal decomposition occurring in the reaction tank. The fuel cell-based generator system further comprises: a cooling water flow path arranged around the fuel cell, cooling water being passed through the cooling water flow path; determination means for determining that the fuel cell is at a stop; and feed means for, when the determination means determines that the fuel cell is at a stop, feeding the cooling water through the cooling water flow path to the heating means.

In this structure, the operation temperature of the fuel cell is lower than the temperature of the thermal decomposition. Cooling water of the fuel cell is fed to the heating means by the feed means at the time of stopping operation of the fuel cell. This structure cools down the reaction tank and thereby enables production of the reaction gas by the gas producing means to be stopped without much delay at the time of stopping operation of the fuel cell.

The fuel cell-based generator system of the above structure may further comprise: a reserve tank for reserving a material, from which the halohydric acid reserved in the reaction tank is produced; and means for feeding the cooling water through the cooling water flow path to a periphery of the reserve tank at a time of stopping the fuel cell.

In this structure, the operation temperature of the fuel cell is lower than the temperature of the thermal decomposition. Cooling water of the fuel cell is fed to the periphery of the reserve tank for reserving the material of the halohydric acid, in addition to the heating means, at the time of stopping operation of the fuel cell. This structure cools down the material of the halohydric acid reserved in the reserve tank as well as the halohydric acid reserved in the reaction tank. This enables production of the reaction gas by the gas producing means to be stopped more swiftly at the time of stopping operation of the fuel cell.

The fuel cell-based generator system of the basic structure may further comprise: a reaction gas discharge path for enabling the reaction gas fed to the first electrode of the fuel cell to be discharged from the fuel cell; and closing means for closing the reaction gas discharge path.

In the fuel cell-based generator system of the basic structure, the thermal decomposition produces only hydrogen in principle and yields no undesirable by-products. This realizes the 100% utilization of the reaction gas in the fuel cell and enables operation of the fuel cell while the reaction gas discharge path in the fuel cell is closed by the closing means. In case that the output of the fuel cell increases with an increase in loading, a greater amount of the reaction gas is required for generating electricity in the fuel cell. Since the outlet of the gaseous fuel in the fuel cell is closed by the closing means, hydrogen existing in the reaction gas supply conduit from the gas producing means to the fuel cell is consumed, so as to lower the gas pressure. The decrease in pressure of the gas producing means increases the amount of the reaction gas produced by the gas producing means. In this manner, the amount of the reaction gas produced by the gas producing means increases with an increase in output of the fuel cell.

In case that the output of the fuel cell decreases with a decrease in loading, on the other hand, a less amount of the reaction gas is required for generating electricity in the fuel cell. Since the outlet of the gaseous fuel in the fuel cell is closed by the closing means, hydrogen existing in the reaction gas supply conduit from the gas producing means to the fuel cell is not consumed, so as to raise the gas pressure. The increase in pressure of the gas producing means decreases the amount of the reaction gas produced by the gas producing means. In this manner, the amount of the reaction gas produced by the gas producing means decreases with a decrease in output of the fuel cell. The heat balance between the gas producing means and the fuel cell realizes the autonomous cooperative operation of the gas producing means and the fuel cell without any synchronous regulation.

The fuel cell-based generator system of the basic structure may further comprise: water recovery means for condensing water vapor evolved from the fuel cell by the electrochemical reaction to recover water; and water feed means for feeding the water recovered by the water recovery means as a material for producing the halohydric acid.

In the fuel cell, water vapor is generally evolved on the cathode through the electrochemical reaction. The water recovery means condenses the water vapor to recover water, whereas the water feed means feeds the water as a material of the halohydric acid. In the course of operation of the fuel cell, the material of the halohydric acid is successively supplied to the reaction tank. This structure also prevents the exhaust gas from the cathode in the fuel cell from causing white fumes in the atmosphere.

In accordance with one preferable application, the fuel cell-based generator system of the basic structure further comprises: a halogen tank for reserving a halogen; a water tank for reserving water; and feed means for feeding the halogen and water from the halogen tank and the water tank to the reaction tank, wherein the heating means is arranged in the vicinity of the reaction tank. In this structure, the gas producing means is further provided with hydrogen purification means for separating gaseous hydrogen from the hydrogen-containing reaction gas produced by the reaction tank. The fuel cell-based generator system of this structure is hereinafter referred to as the fuel cell-based generator system of the third structure.

In the fuel cell-based generator system of the third structure, the feed means respectively feeds a halogen and water from the halogen tank and the water tank to the reaction tank. The reaction tank reserves the halohydric acid obtained by the reaction of the halogen with water. When the reaction tank is heated by the heating means, the halohydric acid is thermally decomposed in the presence of the catalyst for accelerating decomposition of the halohydric acid. This yields a gaseous mixture of hydrogen and the halogen. The hydrogen purification WE means then separates hydrogen from the gaseous mixture. This structure enables the thermal decomposition to be readily performed with the halogen and water.

In accordance with one preferable application of the present invention, the fuel cell-based generator system of the third structure comprises means for transmitting heat generated by the fuel cell to the halogen tank or means for transmitting heat generated by the fuel cell to the water tank.

In this structure, at least either one of the halogen tank and the water tank is heated by the heat generated by the fuel cell. No additional heating means, such as an electric heater, is thus required for preliminarily heating the halogen tank or the water tank. A supply of water at ordinary temperature to the reaction tank lowers the temperature of the reaction tank and makes the temperature unstable. A preferable technique accordingly heats the water tank and the halogen tank, prior to feeding water and the halogen to the reaction tank, and requires additional heating means, such as an electric heater, for that purpose. The preferable application of the present invention, however, does not require any additional heating means and thereby simplifies the structure of the whole fuel cell-based generator system. No requirement for the supplementary energy for the additional heating means enhances the energy efficiency.

In accordance with another preferable application of the present invention, in the fuel cell-based generator system of the third structure, the gas producing means further comprises oxygen purification means for separating oxygen from the reaction gas produced by the reaction tank. The fuel cell-based generator system is further provided with an oxygen supply conduit for feeding the oxygen separated by the oxygen purification means to a second electrode of the fuel cell, the second electrode being different from the first electrode that receives a supply of the reaction gas. The fuel cell-based generator system of this structure is hereinafter referred to as the fuel cell-based generator system of the fourth structure.

In the fuel cell-based generator system of the fourth structure, oxygen is supplied to the second electrode of the fuel cell, whereas hydrogen produced by the reaction tank is supplied to the first electrode. This structure realizes a high energy efficiency of the whole system.

In accordance with one preferable application of the present invention, the fuel cell-based generator system of the fourth structure further comprises: a reaction gas discharge path connected to the fuel cell that receives a supply of the reaction gas from the gas producing means via the reaction gas supply conduit, a remaining portion of the reaction gas consumed by the fuel cell being discharged through the reaction gas discharge path; an oxygen discharge path connected to the fuel cell that receives a supply of oxygen from the gas producing means via the oxygen supply conduit, a remaining portion of the oxygen consumed by the fuel cell being discharged through the oxygen discharge path; a first valve member for regulating a gas flow passing through the reaction gas discharge path; a second valve member for regulating a gas flow passing through the oxygen discharge path; a first pressure sensor for measuring a gas pressure in the reaction gas discharge path; a second pressure sensor for measuring a gas pressure in the oxygen discharge path; and control means for regulating valve positions of the first valve member and the second valve member, in order to control the pressure difference between the gas pressure measured by the first pressure sensor and the gas pressure measured by the second pressure sensor to a predetermined value.

In the fuel cell-based generator system of this preferable structure, the control means regulates the valve positions of the first valve member and the second valve member, thereby controlling the pressure difference between the gas pressure in the reaction gas discharge path and the gas pressure in the oxygen discharge path calculated by the calculation means to a predetermined value.

In the process of generating electricity by the fuel cell, hydrogen is consumed on the anode, whereas oxygen is consumed on the cathode. The molar ratio of hydrogen to oxygen thus consumed is two to one. The molar ratio of hydrogen to oxygen produced by the thermal decomposition in the reaction tank is also two to one. Theoretically, supplies of hydrogen and oxygen produced by the gas producing means to the fuel cell enable consumption of both hydrogen and oxygen in proper quantities. In the actual state, however, varying gas pressures of hydrogen and oxygen both in the fuel cell and in the gas producing means as well as a difference in volume between the gaseous fuel supply conduit and the oxygen supply conduit prevents the ideal consumption of hydrogen and oxygen in proper quantities.

The fuel cell-based generator system of the above preferable structure solves this problem. As discussed above, the control means controls the pressure difference between the gas pressure in the reaction gas discharge path and the gas pressure in the oxygen discharge path to a predetermined value. This structure regulates the gas flow in both the reaction gas supply system and the oxygen supply system, thereby enabling hydrogen and oxygen produced by the gas producing means to be consumed in proper quantities by the fuel cell. This enhances the energy efficiency of the whole fuel cell-based generator system. The structure prevents the pressure difference out of a specific range from occurring between the hydrogen supply system and the oxygen supply system, thus ensuring the safety of the fuel cell-based generator system.

In accordance with another preferable application of the present invention, in the fuel cell-based generator system of the third structure, the hydrogen purification means has a filtration membrane for allowing selective permeation of hydrogen. The fuel cell-based generator system is further provided with: a reaction gas discharge path connected to the fuel cell that receives a supply of the reaction gas from the gas producing means via the reaction gas supply conduit, a remaining portion of the reaction gas consumed by the fuel cell being discharged through the reaction gas discharge path; a regulating means for regulating a gas flow passing through the reaction gas discharge path; pressure difference detection means for detecting a pressure difference before and after the filtration membrane; and control means for regulating a valve position of the valve member, in order to keep the pressure difference detected by the pressure difference detection means within a predetermined range.

In the fuel cell-based generator system of this preferable structure, the control means controls the regulating means, thereby keeping the pressure difference detected by the pressure difference detection means, that is, the pressure difference before and after the filtration membrane in the hydrogen purification means, within a predetermined range. The amount of hydrogen separated by the filtration membrane in the hydrogen purification means generally depends upon the pressure difference between both sides of the filtration membrane. The control of the pressure difference within the predetermined range maintains the amount of hydrogen separation at a constant level. This structure enables a desired amount of hydrogen to be continuously and stably produced, irrespective of a variation in internal pressure of piping in the gas producing means or a variation in internal pressure of piping in the fuel cell.

In accordance with another preferable application of the present invention, the fuel cell-based generator system of the fourth structure further comprises: a reaction gas discharge path connected to the fuel cell that receives a supply of the reaction gas from the gas producing means via the reaction gas supply conduit, a remaining portion of the reaction gas consumed by the fuel cell being discharged through the reaction gas discharge path; an oxygen discharge path connected to the fuel cell that receives a supply of oxygen from the gas producing means via the oxygen supply conduit, a remaining portion of the oxygen consumed by the fuel cell being discharged through the oxygen discharge path; a first valve member for regulating a gas flow passing through the reaction gas discharge path; a second valve member for regulating a gas flow passing through the oxygen discharge path; a first sensor for measuring a gas flow in a flow path at an outlet of the hydrogen purification means; a second sensor for measuring a gas flow in a flow path at an outlet of the oxygen purification means; and control means for regulating valve positions of the first valve member and the second valve member, in order to enable a ratio of the gas flow measured by the first sensor to the gas flow measured by the second sensor to coincide with a ratio of hydrogen to oxygen consumed by the fuel cell.

In the fuel cell-based generator system of this preferable structure, the control means regulates the valve positions of the first valve member and the second valve member, thereby enabling the ratio of the gas flow in the flow path at the outlet of the hydrogen purification means to the gas flow in the flow path at the outlet of the oxygen purification means to coincide with the ratio of hydrogen to oxygen consumed by the fuel cell.

In the process of generating electricity by the fuel cell, hydrogen is consumed on the anode, whereas oxygen is consumed on the cathode. The molar ratio of hydrogen to oxygen thus consumed is two to one. The molar ratio of hydrogen to oxygen produced by the thermal decomposition in the reaction tank is also two to one. Theoretically, supplies of hydrogen and oxygen produced by the gas producing means to the fuel cell enable consumption of both hydrogen and oxygen in proper quantities. In the actual state, however, varying gas pressures of hydrogen and oxygen both in the fuel cell and in the gas producing means as well as a difference in volume between the gaseous fuel supply conduit and the oxygen supply conduit prevents the ideal consumption of hydrogen and oxygen in proper quantities.

Neither the hydrogen purification means nor the oxygen purification means realizes 100% separation of the desired gas. A certain portion of hydrogen or oxygen is discharged off with an unrequired gas component. The difference in principle and operating conditions between the hydrogen purification means and the oxygen purification means causes the ratio of hydrogen to oxygen thus separated to be deviated from the theoretical ratio of two to one. The positive control is thus required to enable consumption of hydrogen and oxygen in proper quantities.

The fuel cell-based generator system of the above preferable structure solves this problem. As discussed above, the control means carries out the control, in order to enable the ratio of the gas flow in the flow path at the outlet of the hydrogen purification means to the gas flow in the flow path at the outlet of the oxygen purification means to coincide with the ratio of hydrogen to oxygen consumed by the fuel cell, thereby enabling hydrogen and oxygen produced by the gas producing means to be consumed in proper quantities by the fuel cell. This enhances the energy efficiency of the whole fuel cell-based generator system. The structure prevents the pressure difference out of a specific range from occurring between the hydrogen supply system and the oxygen supply system, thus ensuring the safety of the fuel cell-based generator system.

In accordance with still another preferable application of the present invention, the fuel cell-based generator system of the basic structure further comprises a reaction gas discharge path connected to the fuel cell that receives a supply of the reaction gas from the gas producing means via the reaction gas supply conduit, a remaining portion of the reaction gas consumed by the fuel cell being discharged through the reaction gas discharge path. In this structure, the heating means is provided with means for combusting the reaction gas discharged through the reaction gas discharge path to generate heat.

This structure combusts a remaining portion of the reaction gas discharged from the fuel cell, and heats the reaction tank by the heat of combustion, thereby not requiring any supplementary fuel for heating the reaction tank and enhancing the energy efficiency. Since hydrogen is comprised in the remaining portion of the reaction gas discharged from the fuel cell, a specific device is required to treat the exhaust gas. This preferable application, however, does not require any specific device for the treatment and thereby simplifies the structure of the whole fuel cell-based generator system.

In accordance with another preferable application of the present invention, the fuel cell-based generator system of the basic structure further comprises reserve means for reserving the reaction gas produced by the gas producing means. The heating means is provided with means for combusting the reaction gas reserved in the reserve means to generate heat.

This structure enables the reaction tank to be heated by taking advantage of the reaction gas produced by the gas producing means, thus not requiring any supplementary fuel for heating the reaction tank and enhancing the energy efficiency.

In accordance with another preferable application of the present invention, the fuel cell-based generator system of the basic structure further comprises: reserve means for reserving the reaction gas produced by the gas producing means; and starting-time reaction gas supply means for feeding the reaction gas reserved in the reserve means to the fuel cell through the reaction gas supply conduit at a time of starting operation of the fuel cell.

At the time of starting the fuel cell-based generator system, there is generally a time lag before the gas producing means starts working sufficiently. This preferable structure enables the gaseous fuel to be supplied to the fuel cell without much delay.

At the time of starting the fuel cell-based generator system, it is impossible to heat the reaction tank by taking advantage of the hot exhaust from the fuel cell (the second structure) or by combusting the remaining portion of the reaction gas discharged from the fuel cell. An additional electric heater is thus required for the starting operation. In the fuel cell-based generator system of the preferable structure, on the other hand, the reaction gas reserved in the reserve means is supplied to the fuel cell at the starting time. This structure accordingly does not require operation of the gas producing means at the starting time nor the additional electric heater for the starting operation. This simplifies the structure of the whole fuel cell-based generator system. After the start, the fuel cell starts its operation, and the reaction tank can thus be heated by taking advantage of the hot exhaust from the fuel cell or by combusting the remaining portion of the reaction gas discharged from the fuel cell.

In accordance with still another preferable application of the present invention, the fuel cell-based generator system of the basic structure further comprises: water producing means for producing water from a remaining portion of the reaction gas discharged from the fuel cell and an oxygen-containing gas supplied from outside; and water feed means for feeding the water produced by the water producing means as a material for producing the halohydric acid.

In the course of operation of the fuel cell, the water producing means successively produces water as a material of the halohydric acid reserved in the reaction tank. The residual gas containing hydrogen can not be released to the atmosphere without any treatment. This structure enables the residual gas to be effectively used and enhances the energy efficiency of the whole system.

The present invention is also directed to a method of generating electricity with fuel cells, which comprises the steps of:

(a) generating heat;
(b) reserving a halohydric acid produced by a reaction of a halogen with water as well as a catalyst for accelerating decomposition of the halohydric acid, and producing a gaseous mixture of hydrogen and another substance by thermal decomposition with the heat generated in the step (a); and
(c) feeding gaseous hydrogen comprised in the gaseous mixture as a reaction gas to an electrode with a catalyst carried thereon, and generating an electromotive force through an electrochemical reaction of the reaction gas The method of the present invention has the same functions and effects as those of the fuel cell-based generator system of the basic structure discussed above. This method prevents the catalyst in the fuel cell from being poisoned and the potential on the oxygen electrode of the fuel cell from lowering while improving the energy efficiency.

In accordance with one preferable application, the step (b) is carried out by taking advantage of heat generated by the electrochemical reaction in the step (c).

These and other objects, features, aspects, and advantages of the present invention will become more apparent from the following detailed description of the preferred embodiments with the accompanying drawings.

DESCRIPTION OF THE PREFERRED EMBODIMENTS

Some modes of carrying out the present invention are described as preferred embodiments.

Figure 1:
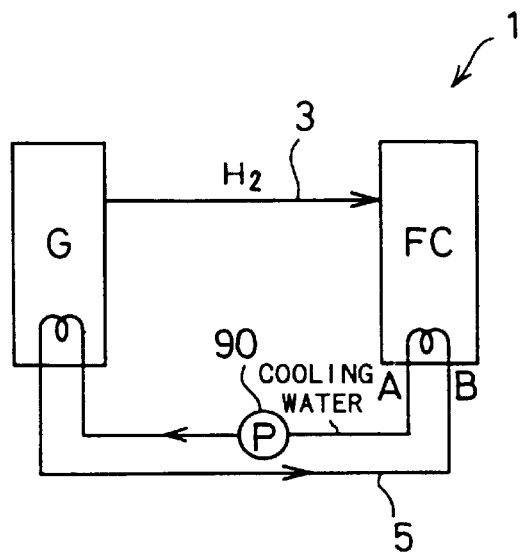
FIG. 1 is a block diagram schematically illustrating structure of a fuel cell-based generator system 1 as a first embodiment according to the present invention.

FIG. 1 is a block diagram schematically illustrating a fuel cell-based generator system 1 as a first embodiment according to the present invention. The fuel cell-based generator system 1 includes a stack of phosphate fuel cells FC for generating electricity, a gas generator G for producing gaseous hydrogen from water through thermal decomposition, and a gaseous fuel supply conduit 3 for feeding gaseous hydrogen produced by the gas generator G as a gaseous fuel to the stack of fuel cells FC. The fuel cell-based generator system 1 further includes a cooling water circulation path 5 for circulating the cooling water, which runs through a cooling plate (discussed later) in the stack of fuel cells FC, into the gas generator G.

The following describes structure of the stack of fuel cells FC.

Figure 2:
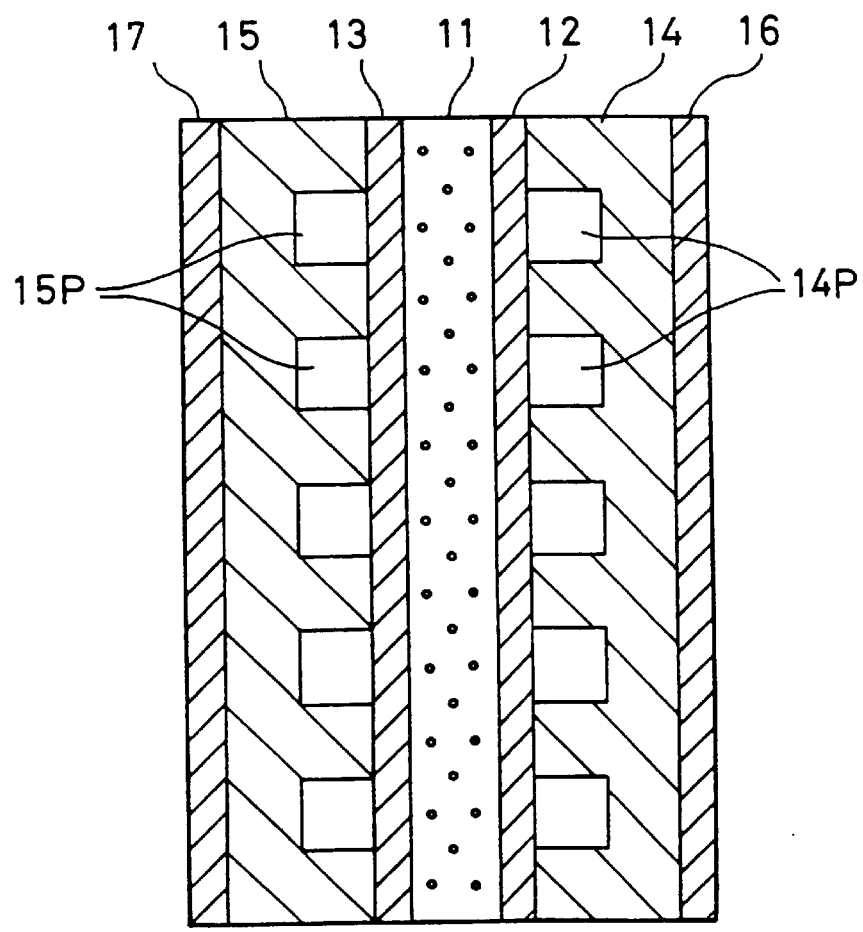
FIG. 2 shows each cell structure of a stack of fuel cells FC.
Figure 3:
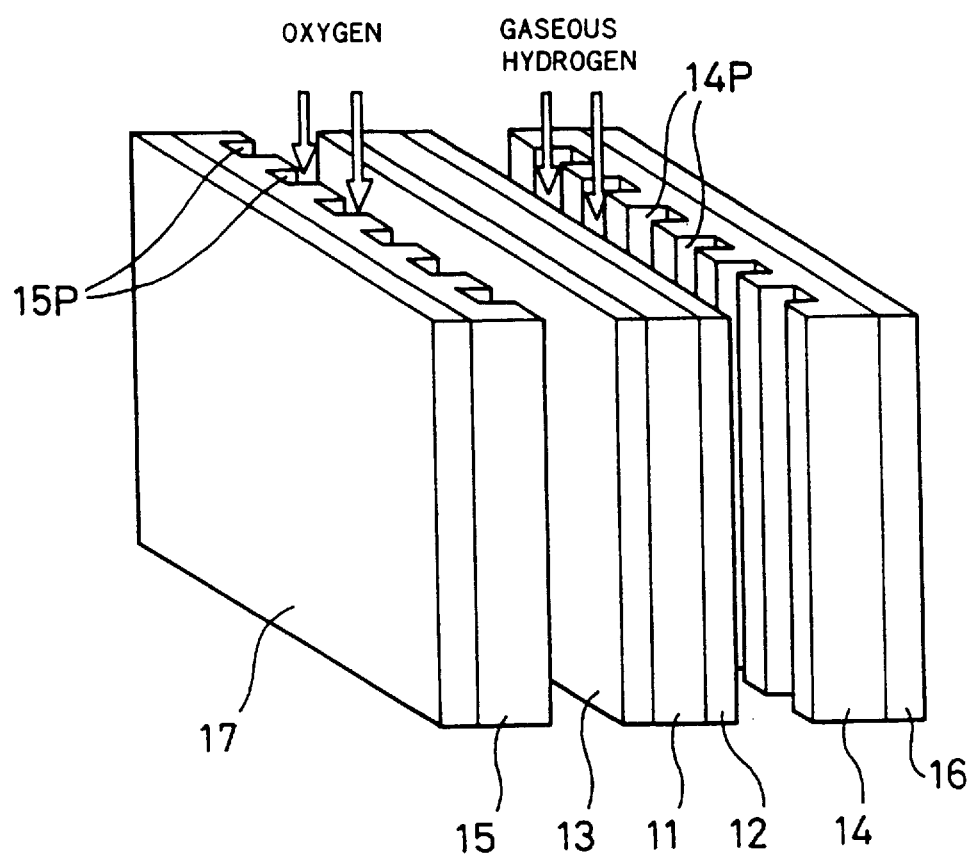
FIG. 3 is a decomposed perspective view illustrating the cell structure of the stack of fuel cells FC.

The stack of fuel cells FC consists of a plurality of phosphate fuel cells as mentioned above, and each unit cell has, the structure shown in the sectional view of FIG. 2 and the decomposed perspective view of FIG. 3. Referring to FIGS. 2 and 3, each unit cell includes an electrolyte 11, an anode 12 and a cathode 13 functioning as gas diffusion electrodes and arranged across the electrolyte 11 to form a sandwich structure, separators 14 and 15 arranged across the sandwich structure and respectively connecting with the anode 12 and the cathode 13 to define flow paths of a gaseous fuel and flow paths of an oxidizing gas, and current-collecting plates 16 and 17 arranged outside the separators 14 and 15 to work as current-collecting poles of the anode 12 and the cathode 13.

The electrolyte 11 is composed of a silicon carbide matrix impregnated with concentrated liquid phosphoric acid. Here the matrix implies a base material being impregnated with and supporting phosphoric acid. Both the anode 12 and the cathode 13 are composed of porous carbon bases, on which carbon power with platinum or a platinum alloy functioning as a catalyst and being carried thereon is applied.

The carbon powder with platinum carried thereon is prepared in the following manner. An aqueous solution of sulfitoplatinum complex is obtained by mixing an aqueous solution of chloroplatinic acid and sodium thiosulfate. Hydrogen peroxide is added dropwise to the aqueous solution of sulfitoplatinum complex with stirring. This makes colloidal platinum particles deposit in the aqueous solution. Carbon black (for example, Vulcan XC-72 (trade mark by CABOT Corp., the USA) or Denka Black (trade mark by DENKI KAGAKU KOGYO K.K.)) is then added to the colloid with stirring, so that the colloidal platinum particles adhere to the surface of carbon black. The carbon black with platinum particles adhering thereto is separated from the solution by filtration either under reduced pressure or under pressure, washed repeatedly with deionized water (pure water), and completely dried at room temperature. The aggregated carbon black is ground with a grinder and heated in a hydrogen reducing atmosphere at 250° to 350° C. for approximately two hours. This reduces platinum on the carbon black and completely removes the remaining chlorine, thereby completing carbon powder with platinum carried thereon.

The separators 14 and 15 are composed of dense carbon plates. Flow paths 14P of gaseous hydrogen or gaseous fuel are defined by the surface of the anode 12 and the separator 14. The flow paths 14P also function as channels of water generated on the anode 12. Flow paths 15P of oxygen or material gas are, on the other hand, defined by the surface of the cathode 13 and the separator 15. The current-collecting plates 16 and 17 are composed of copper (Cu).

Figure 4:
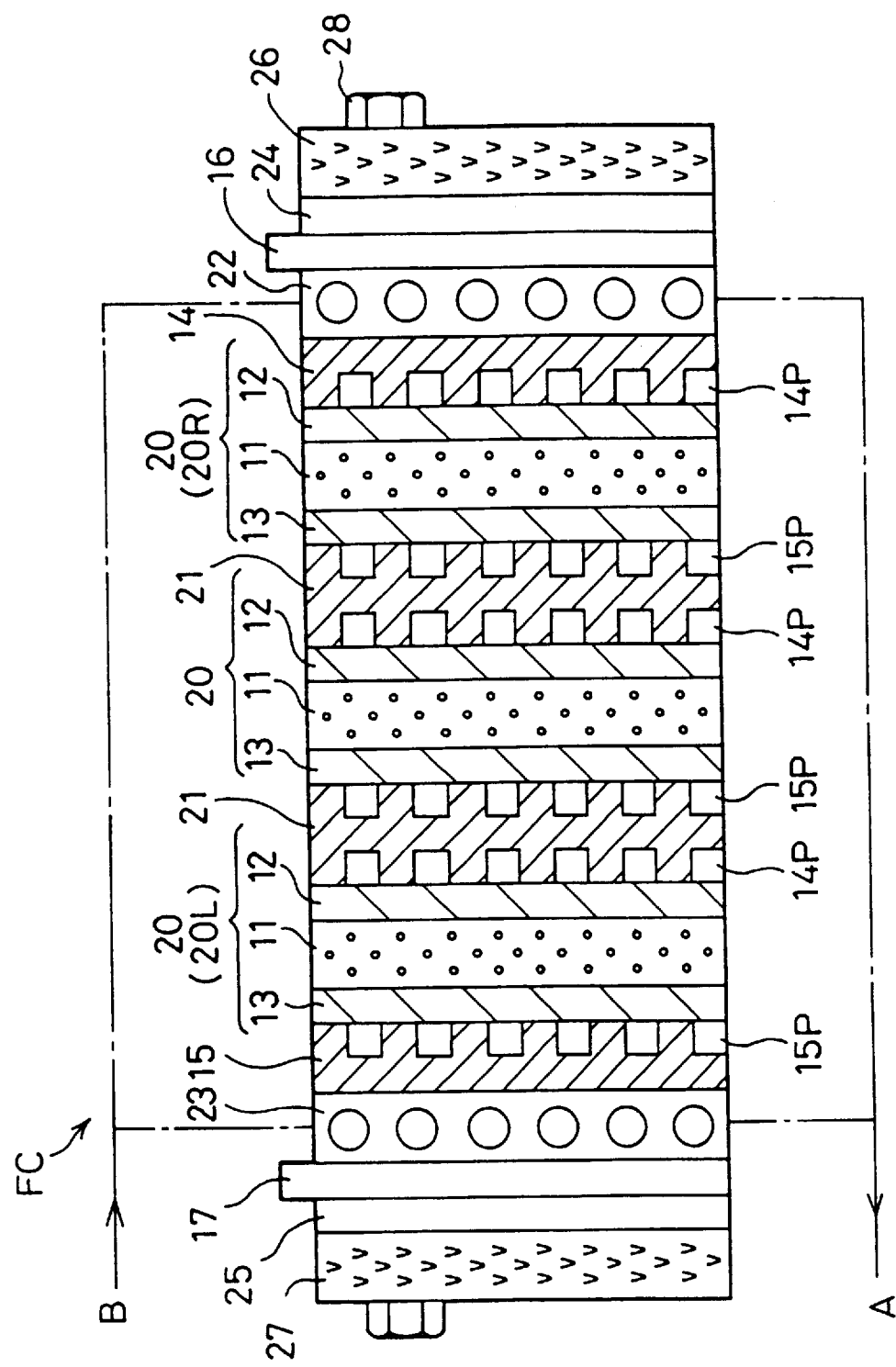
FIG. 4 shows general structure of the stack of fuel cells FC.

The above description refers to the structure of the unit cell in phosphate fuel cells. The stack of fuel cells FC has a plurality of these unit cells laid one upon another. FIG. 4 shows the general structure of the stack of fuel cells FC. Like numerals and symbols are allocated to the same elements in FIG. 4 as those in FIGS. 2 and 3.

Referring to FIG. 4, the stack of fuel cells FC includes a plurality of sandwich structures 20, each of which consists of the electrolyte 11, the anode 12, and the cathode 13 as shown in FIGS. 2 and 3 and is interposed between separators 21. The separators 21 are composed of the same material as that of the separators 14 and 15 of the unit cell shown in FIGS. 1 and 2. Each separator 21 has flow paths 14P of gaseous hydrogen formed on the side adjoining to the anode 12 and flow paths 15P of oxygen formed on the side adjoining to the cathode 13. The separator 14 having only the flow paths 14P of gaseous hydrogen (identical with the separator 14 shown in FIGS. 2 and 3) is arranged outside a right-most sandwich structure 20R in FIG. 4. The separator 15 having only the flow paths 15P of oxygen is arranged outside a left-most sandwich structure 20L.

The stack of fuel cells FC further includes cooling plates 22 and 23 arranged outside these separators 14 and 15, current-collecting plates 16 and 17 arranged outside the cooling plates 22 and 23, end plates 26 and 27 arranged across the whole structure via insulating plates 24 and 25, and clamping bolts 28 for inwardly clamping the end plates 26 and 27.

The cooling plates 22 and 23 include a plurality of flow paths of cooling water, through which cooling water supplied from the outside is circulated. Points A and B located at the joints of the flow paths connecting with the cooling plates 22 and 23 are connected to the cooling water circulation path 5, so that cooling water running through the cooling plates 22 and 23 is flown into the gas generator G via the cooling water circulation path 5.

Although the stack of fuel cells FC includes three unit cells in the example of FIG. 4, the unit cells included in the stack of fuel cells FC are not restricted to this number. The cooling plates are arranged on both ends of the stack of fuel cells FC in the example of FIG. 4, but a cooling plate may be interposed between each pair of unit cells.

Figure 5:
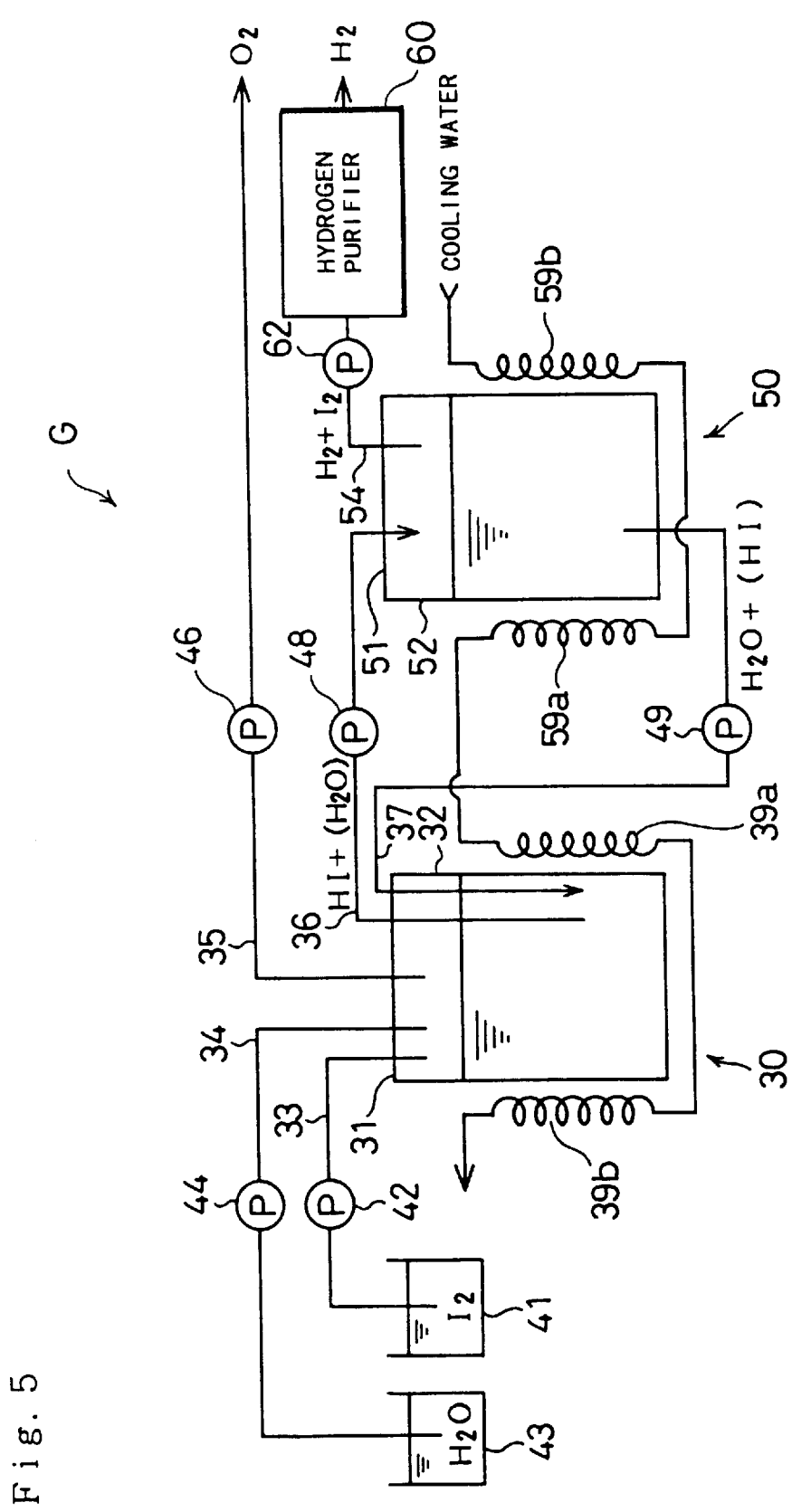
FIG. 5 schematically illustrates structure of a gas generator G.

The following describes structure of the gas generator G. FIG. 5 schematically illustrates structure of the gas generator G. The gas generator G is provided with two reaction tanks 30 and 50 used for the thermal decomposition carried out in a stepwise manner. In the description below, the reaction tank 30 on the first stage is referred to as the preliminary reaction tank, for the purpose of distinction from the reaction tank 50 on the latter stage.

Figure 6:
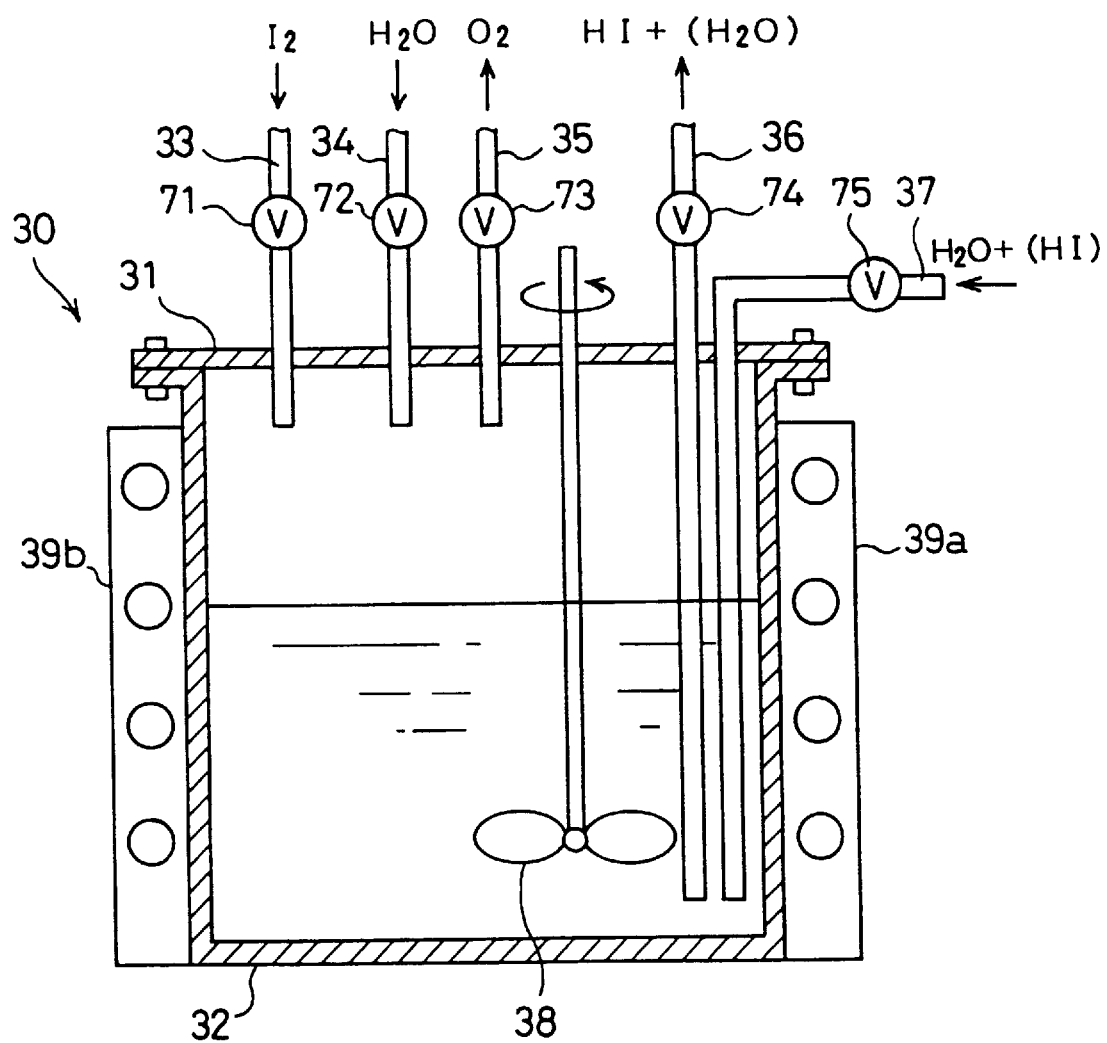
FIG. 6 schematically illustrates the internal structure of a preliminary reaction tank 30.

FIG. 6 schematically illustrates the internal structure of the preliminary reaction tank 30. Referring to FIGS. 5 and 6, the preliminary reaction tank 30 has a vessel 32 with a cover 31. First to third conduits 33, 34, and 35 pass through the cover 31 to have the respective lower ends arranged above the liquid surface in the vessel 32, whereas fourth and fifth conduits 36 and 37 pass through the cover 31 to have the respective lower ends arranged below the liquid surface in the vessel 32.

A halogen tank 41 disposed outside the gas generator G for reserving iodine ($I_2$), a halogen, is connected to the first conduit 33. $I_2$ is pumped up with a pump 42 and fed into the preliminary reaction tank 30 via the first conduit 33. A water tank 43 disposed outside the gas generator G for reserving water ($H_2O$) is connected to the second conduit 34. $H_2O$ is pumped up with a pump 44 and fed into the preliminary reaction tank 30 via the second conduit 34. The third conduit 35 is connected to the outside for discharging a gas ($O_2$) produced in the preliminary reaction tank 30 to the outside by means of a pump 46.

The fourth conduit 36 and the fifth conduit 37 are respectively connected to the reaction tank 50. The solution ($H_2O$ with HI (hydrogen iodide) dissolved therein) is thereby circulated between the preliminary reaction tank 30 and the reaction tank 50 by means of pumps 48 and 49 respectively disposed in the fourth conduit 36 and the fifth conduit 37.

The vessels 32 of the preliminary reaction tank 30 is further provided with an impeller 38 (FIG. 6), which stirs the solution in the vessel 32. Cooling plates 39a and 39b functioning as heating means are arranged around the vessel 32. The cooling plates 39a and 39b include a plurality of flow paths of cooling water, through which cooling water supplied from the outside is circulated.

Figure 7:
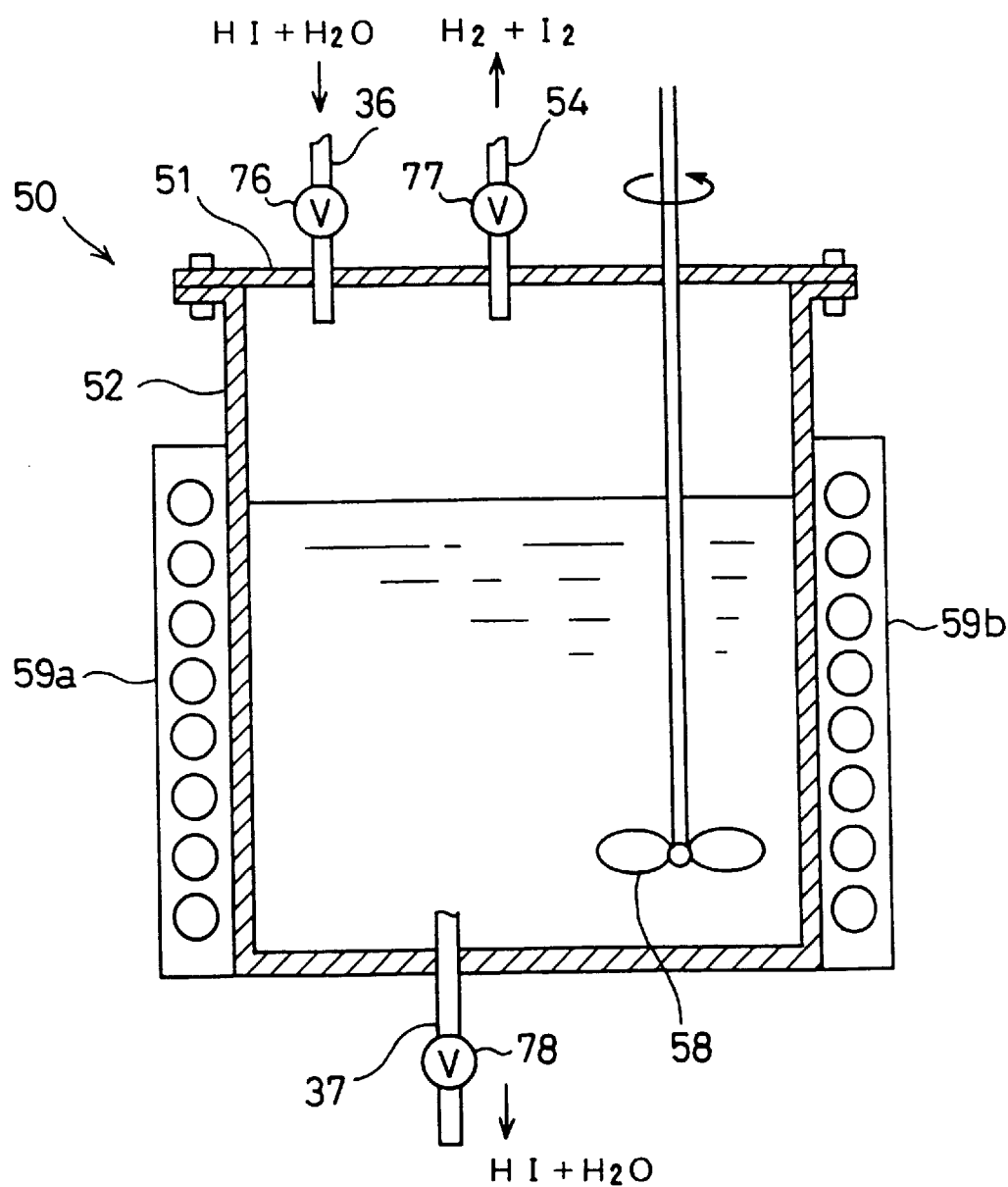
FIG. 7 schematically illustrates the internal structure of a reaction tank 50.

FIG. 7 schematically illustrates the internal structure of the reaction tank 50. Referring to FIGS. 5 and 7, like the preliminary reaction tank 30, the reaction tank 50 has a vessel 52 with a cover 51. The fourth conduit 36 connecting with the preliminary reaction tank 30 passes through the cover 51 to have its lower end arranged above the liquid surface in the vessel 52. A sixth conduit 54 also passes through the cover 51 to have its lower end arranged above the liquid surface in the vessel 52. The fifth conduit 37 connecting with the preliminary reaction tank 30 is connected to the bottom of the vessel 52.

The sixth conduit 54 is connected to a hydrogen purifier 60, so as to feed a gas (a gaseous mixture of $H_2$ and $I_2$) produced in the reaction tank 50 to the hydrogen purifier 60 by means of a pump 62.

The reaction tank 50 is preferably composed of active carbon, more specifically active carbon treated with an alkali solution, such as KOH (potassium hydroxide) or NaOH (sodium hydroxide), to have basic functional groups on the surface thereof. The active carbon functions as a catalyst for accelerating thermal decomposition of a halohydric acid fed into the reaction tank 50. Further preferable is addition of a reducing agent, such as cobalt oxide (CoO), tin oxide (SnO), tungsten oxide ($WO_2$), lead oxide ($Pb_2O_3$), platinum oxide (PtO), or titanium. to the active carbon.

The vessel 52 of the reaction tank 50 is further provided with an impeller 58 (see FIG. 7), which stirs the solution in the vessel 52. Cooling plates 59a and 59b are arranged around the vessel 52. The cooling plates 59a and 59b include a plurality of flow paths of cooling water, through which cooling water supplied from the outside is circulated. The cooling plates 59a and 59b around the reaction tank 50 are linked with the cooling plates 39a and 39b around the preliminary reaction tank 30, and are further connected to the cooling plates 22 and 23 in the stack of fuel cells FC via the coolingwater circulation path 5. Heat produced by the operation of the stack of phosphate fuel cells FC is 170° to 220° C. The heat is transmitted to the preliminary reaction tank 30 via the cooling water circulation path 5.

Since the operation temperature of the phosphate fuel cells exceeds 100° C., cooling water running through the cooling water circulation path 5 is circulated under pressure by means of a circulation pump 90 (see FIG. 1). This prevents cooling water from being boiled. Another liquid heat medium having a boiling point higher than the operation temperature of the stack of fuel cells FC, for example, silicone oil, may be used instead of cooling water.

The hydrogen purifier 60 separates gaseous hydrogen ($H_2$) from the gaseous mixture of $H_2$ and $I_2$ fed from the reaction tank 50, and includes a hydrogen filter having a filtration membrane that selectively allows permeation of hydrogen. The filtration membrane is prepared by forming a dense palladium membrane on the surface of a metal or porous ceramics according to a physical or chemical process, such as plating, depositing, or spattering. The pressure difference between both sides of the palladium membrane is kept at a predetermined or greater level, so that only hydrogen can selectively pass through the palladium membrane.

Referring to FIGS. 6 and 7, the first through the sixth conduits 33 to 37 and 54 have valves 71 through 78 that are disposed in the vicinity of the connections with the reaction tanks 30 and 50 to arbitrarily open and close the conduits 33 to 37 and 54.

The following describes operation of the gas generator G thus constructed. While $I_2$ is fed from the halogen tank 41 to the preliminary reaction tank 30 via the first conduit 33, $H_2O$ is fed from the water tank 43 to the preliminary reaction tank 30 via the second conduit 34. The preliminary reaction tank 30 is heated to be not lower than 60° C. or more preferably not lower than 80° C. by the heat transmitted from the stack of fuel cells FC, and the reaction expressed by Equation (4) occurs in the preliminary reaction tank 30:

$$H_2O + I_2 \rightarrow 2HI + (\tfrac{1}{2})O_2 \qquad (4)$$

The $O_2$ gas produced by the reaction of Equation (4) is discharged to the outside via the third conduit 35. HI produced by the reaction of Equation (4) is dissolved in excess $H_2O$ and fed into the reaction tank 50 via the fourth conduit 36. The reaction tank 50 is heated by the heat transmitted from the stack of fuel cells FC, and the reaction expressed by Equation (5) occurs in the reaction tank 50:

$$2HI \rightarrow H_2 + I_2 \qquad (5)$$

The reaction shown by Equation (5) represents thermal decomposition in the presence of the active carbon. The active carbon enables thermal decomposition at relatively low temperatures of not lower than 80° C. or more preferably not lower than 140° C. The gaseous mixture of $H_2$ and $I_2$ produced by the reaction of Equation (5) is fed to the hydrogen purifier 60 via the sixth conduit 54. The hydrogen purifier 60 separates gaseous hydrogen ($H_2$) from the gaseous mixture of $H_2$ and $I_2$. A certain portion of HI dissolved in the solution supplied through the fourth conduit 36 is consumed by the reaction of Equation (5). The solution with a less amount of HI is then fed into the preliminary reaction tank 30 via the fifth conduit 37. Circulation of the HI-containing solution between the preliminary reaction tank 30 and the reaction tank 50 enables the concentration of HI to be kept at a desired high level in the reaction tank 50.

Referring back to FIG. 1, the gaseous fuel supply conduit 3 connects the discharge of the gas generator G with the flow paths 14P of gaseous hydrogen in the stack of fuel cells FC. In accordance with a concrete structure, the in-flow ends of the plurality of flow paths 14P of gaseous hydrogen disposed in the stack of fuel cells FC are joined to a manifold (not shown), and the gaseous fuel supply conduit 3 connects the manifold with the discharge of the hydrogen purifier 60 included in the gas generator G.

As discussed above, in the fuel cell-based generator system 1 of the first embodiment, gaseous hydrogen is produced from water by thermal decomposition in the gas generator G and supplied as a gaseous fuel to the stack of fuel cells FC. The thermal decomposition yields only hydrogen and oxygen in principle, and does not give undesirable by-products that cause deterioration of the cell functions, such as carbon monoxide and methanol. This structure accordingly solves the problems of poisoning the catalyst in the fuel cells and lowering the potential on the oxygen electrode. No generation of by-products enables 100% use of gaseous hydrogen in the stack of fuel cells FC, thereby enhancing the energy efficiency.

In the structure of the first embodiment, cooling water 39 is circulated between the stack of fuel cells FC and the gas generator G via the cooling water circulation path 5. This structure enables the preliminary reaction tank 30 and the reaction tank 50 in the gas generator G to be heated by the heat discharged from the phosphate fuel cells. No additional heating means, such as heaters, is thus required for heating the reaction tanks 30 and 50. This favorably simplifies the structure of the gas generator G. Utilization of the hot exhaust from the stack of fuel cells FC in the gas generator G enhances the energy efficiency of the whole fuel cell-based generator system 1. The amount of heat produced by the fuel cells is varied with the amount of electricity generated by the fuel cells. This allows autonomous feedback control of the amount of the gas-produced by the gas generator G according to the amount of electricity generated by the fuel cells.

In the fuel cell-based generator system 1 of the first embodiment, a radiator (not shown) may be disposed in the middle of the cooling water circulation path 5. This regulates the temperature of cooling water, thereby readily controlling the temperature in the stack of fuel cells FC.

In the fuel cell-based generator system 1, oxide electrolyte fuel cells, molten carbonate fuel cells, and direct methanol fuel cells may be used in place of the phosphate fuel cells. Any fuel cells having the operation temperature higher than the heating temperature of the gas generator G can be used in the fuel cell-based generator system 1.

Figure 8:
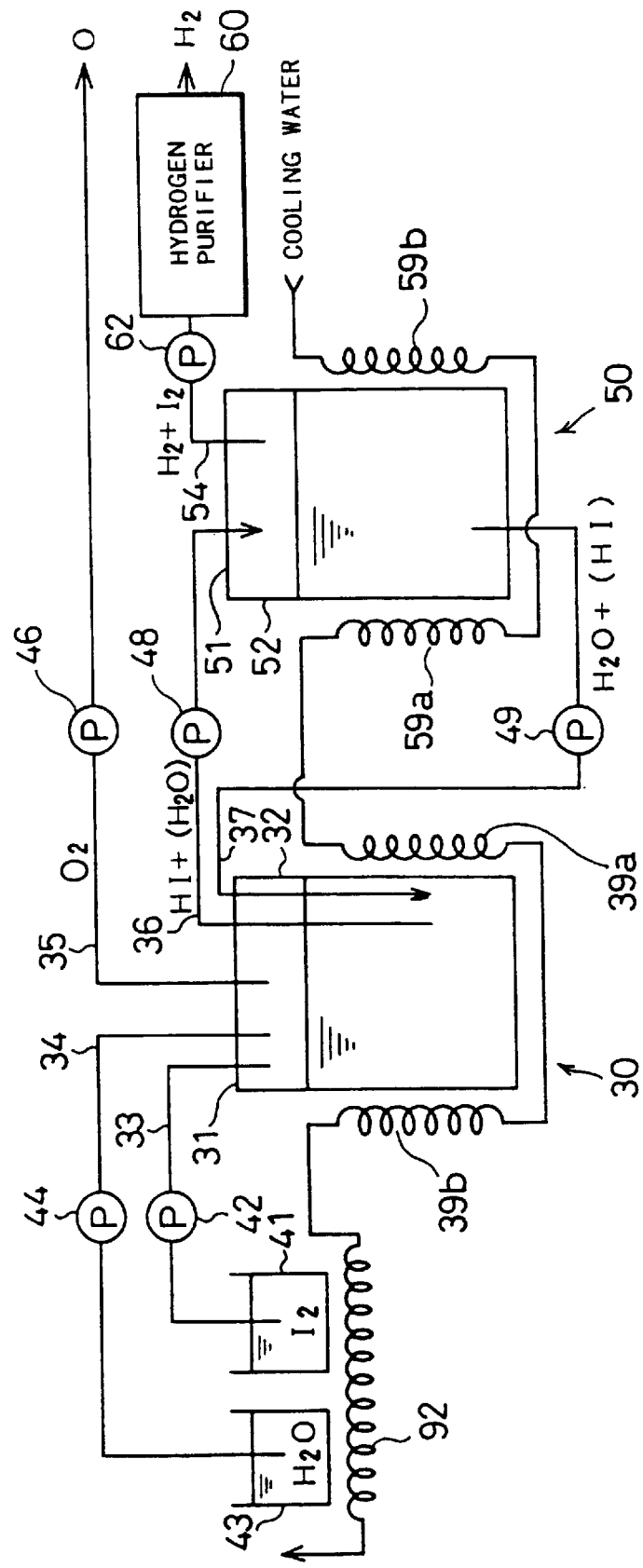
FIG. 8 schematically illustrates structure of another gas generator as a modification of the first embodiment.

In the structure of the first embodiment, cooling water running through the stack of fuel cells FC is circulated around the preliminary reaction tank 30 and the reaction tank 50 in the gas generator G. In addition to this structure, a cooling plate 92 that is connected to the cooling water system may be disposed around the halogen tank 41 and the water tank 43 as shown in FIG. 8, in order to enable the cooling water to be circulated around the halogen tank 41 and the water tank 43. The modified structure allows the halogen tank 41 and the water tank 43 as well as the preliminary reaction tank 30 and the reaction tank 50 in the gas generator G to be heated by the heat generated by the stack of fuel cells FC. This structure accelerates the thermal decomposition without any additional heating means, such as electric heaters, for preliminarily heating the halogen tank 41 and the water tank 43. This simplifies the structure of the whole fuel cell-based generator system 1 and does not require any energy for the additional heating means, thereby enhancing the energy efficiency.

In the above modified structure, the gas generator G, the halogen tank 41, and the water tank 43 are all heated by the heat of cooling water. Another possible structure may heat either one of the halogen tank 41 and the water tank 43 in addition to the gas generator G, or only heat either one of the halogen tank 41 and the water tank 43.

In the structure of the first embodiment, cooling water running through the stack of fuel cells FC is flown into the gas generator G, and the preliminary reaction tank 30 and the reaction tank 50 included in the gas generator G are heated by the hot exhaust from the stack of fuel cells FC. In accordance with another possible structure, the gas generator G may be heated by additional heating means, such as a burner. Although requiring the additional heating means, this modified structure enables hydrogen to be produced from water by thermal decomposition and thereby does not yield any by-products other than hydrogen and oxygen. No generation of by-products enables 100% use of gaseous hydrogen in the stack of fuel cells FC, thereby enhancing the energy efficiency.

Figure 9:
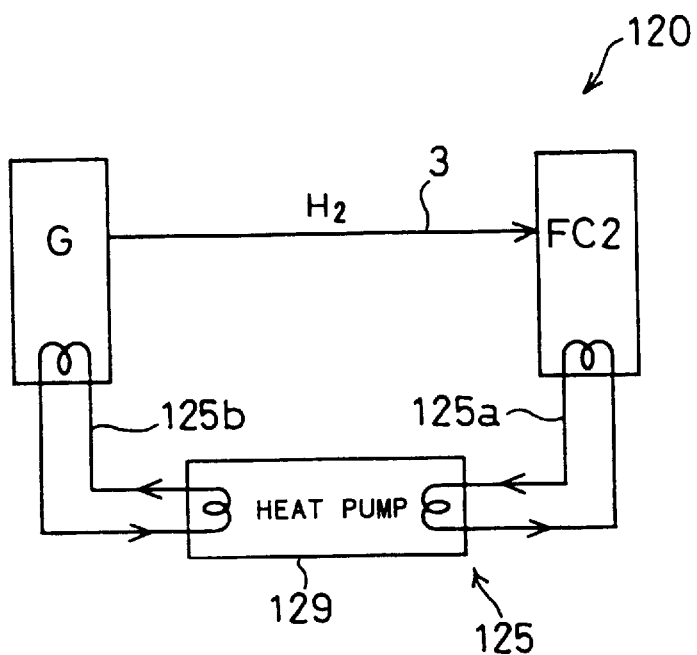
FIG. 9 is a block diagram schematically illustrating structure of a fuel cell-based generator system 120 as a second embodiment according to the present invention.

FIG. 9 is a block diagram schematically illustrating structure of a fuel cell-based generator system 120 as a second embodiment according to the present invention. Referring to FIG. 9, the fuel cell-based generator system 120 of the second embodiment includes a stack of fuel cells FC2 and a cooling water circulation path 125 as different constituents from those of the fuel cell-based generator system 1 of the first embodiment. The other constituents, that is, the gas generator G and the gaseous fuel supply conduit 3, are identical with those of the first embodiment.

The stack of fuel cells FC2 in the second embodiment consists of a plurality of polymer electrolyte fuel cells. In the stack of polymer electrolyte fuel cells FC2, an ion-exchange membrane primarily composed of a polymer material, such as a fluororesin, is used as the electrolyte. The other structure is substantially similar to that of the phosphate fuel cells in the first embodiment. The operation temperature of the polymer electrolyte fuel cells is approximately 80° C.

The cooling water circulation path 125 includes a first circulation path 125a connecting with the flow paths of cooling water in the stack of fuel cells FC2 and a second circulation path 125b connecting with the cooling plates 39a, 39b, 59a, and 59b (see FIG. 5) disposed around the preliminary reaction tank 30 and the reaction tank 50 in the gas generator G. A heat pump 129 is interposed between the first circulation path 125a and the second circulation path 125b. The heat pump 129 has a known structure that enables heat transmission from the lower-temperature side to the higher-temperature side, and raises the temperature of the heat generated by the operation of the stack of fuel cells FC2 to be higher than the operation temperature of the gas generator G.

In the fuel cell-based generator system 120 of the second embodiment, the operation temperature of the stack of polymer electrolyte fuel cells FC2 is relatively low, and the heat pump 129 is accordingly used to raise the temperature of the cooling water which is circulated around the preliminary reaction tank 30 and the reaction tank 50 in the gas generator G. Like in the first embodiment, in the fuel cell-based generator system 120 of the second embodiment, the hot exhaust from the stack of fuel cells FC2 is used to heat the reaction tanks 30 and 50 in the gas generator G. This enhances the energy efficiency of the whole fuel cell-based generator system 120. In the second embodiment, the heat pump 129 is used as the supplementary heating means for heating the cooling water fed to the reaction tanks 30 and 50 in the gas generator G. The required capacity of the heat pump 129 is accordingly not high, and the small heat pump 129 is sufficiently used for the supplementary purpose. This simplifies the structure of the gas generator G, like the first embodiment.

Any fuel cells having the operation temperature lower than the heating temperature of the reaction tanks 30 and 50 included in the gas generator G are applicable to the fuel cell-based generator system 120. Such fuel cells include alkali fuel cells and regenerative fuel cells with a fluoride ion-exchange membrane, other than the polymer electrolyte fuel cells.

Figure 10:
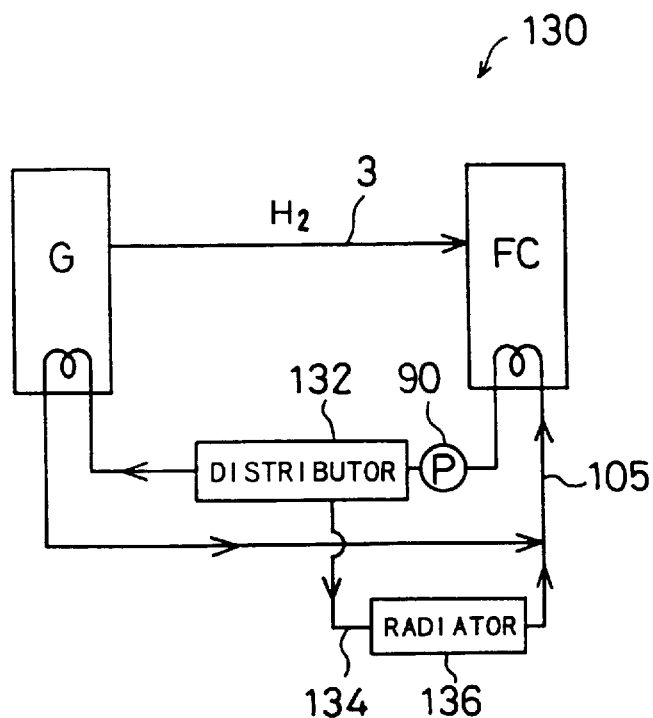
FIG. 10 is a block diagram schematically illustrating structure of a fuel cell-based generator system 130 as a third embodiment according to the present invention.

FIG. 10 is a block diagram schematically illustrating structure of a fuel cell-based generator system 130 as a third embodiment according to the present invention. Referring to FIG. 10, the fuel cell-based generator system 130 of the third embodiment has a similar structure to that of the fuel cell-based generator system 1 of the first embodiment, except a cooling water circulation path 105.

The cooling water circulation path 105 is provided with a distributor 132 for branching off the circulated cooling water, a conduit 134 for returning the cooling water branched off by the distributor 132 into the cooling water circulation path 105, and a radiator 136 disposed in the middle of the conduit 134. The flow of cooling water branched off by the distributor 132 is determined in advance to be a fixed value, according to a predetermined ratio of the heat generated by the stack of fuel cells FC, which enables the gas generator G to be appropriately heated.

In the fuel cell-based generator system 130 of the third embodiment, the amount of heat fed to the gas generator G is appropriately regulated by the distributor 132. This allows the gas generator G to produce a required amount of gaseous hydrogen for the stack of fuel cells FC.

Figure 11:
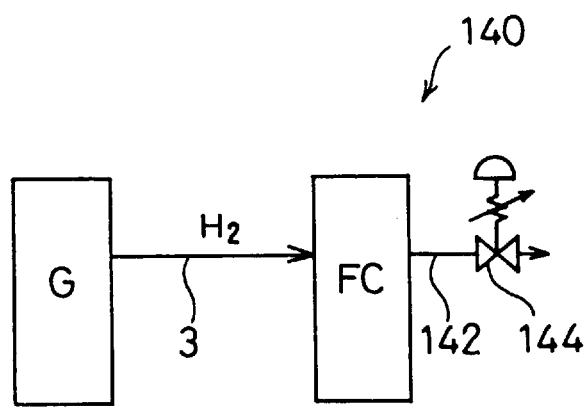
FIG. 11 is a block diagram schematically illustrating structure of a fuel cell-based generator system 140 as a fourth embodiment according to the present invention.

FIG. 11 is a block diagram schematically illustrating structure of a fuel cell-based generator system 140 as a fourth embodiment according to the present invention. Referring to FIG. 11, the fuel cell-based generator system 140 of the fourth embodiment includes the gas generator G, the stack of fuel cells FC, and the gaseous fuel supply conduit 3 connecting the gas generator G with the stack of fuel cells FC, which are all identical with those in the first embodiment. The fourth embodiment does not have the cooling water circulation path 5 included in the first embodiment. Although the flow paths of cooling water in the stack of fuel cells FC are omitted from the illustration of FIG. 11, the fuel cell-based generator system 140 includes a circulation path that connects with the flow paths of cooling water running through the stack of fuel cells FC. The cooling water is circulated in the stack of fuel cells FC, while a radiator disposed in the middle of the circulation path cools down the cooling water.

The discharge ends of the plurality of flow paths 14P of gaseous hydrogen in the stack of fuel cells FC are joined to a manifold (not shown), which connects with a gaseous fuel discharge conduit 142. A back-pressure control valve 144 is disposed in the course of the gaseous fuel discharge conduit 142 (as close as possible to the upstream end).

The back-pressure control valve 144 is generally in a closed position to close the gaseous fuel discharge conduit 142. In case that the internal pressure of the gaseous fuel discharge conduit 142 exceeds a predetermined level, the back-pressure control valve 144 is switched to an open position to release the gaseous fuel and return the internal pressure to the predetermined level. The back-pressure control valve 144 effectively prevents the internal pressure of the gaseous fuel discharge conduit 142 from abruptly increasing with the ceased output from the stack of fuel cells FC.

When the output from the stack of fuel cells FC is increased with an increase in loading, a greater amount of gaseous hydrogen is required for generation of electricity in the stack of fuel cells FC. In the fuel cell-based generator system 140 of the fourth embodiment, the gaseous fuel discharge conduit 142 connecting with the stack of fuel cells FC is generally closed by the back-pressure control valve 144. The increase in output causes the gaseous hydrogen existing in the passage between the gas generator G and the discharge ends of the flow paths 14P of gaseous hydrogen to be consumed. This lowers the gas pressure and increases the amount of the gas produced by the preliminary reaction tank 30 and the reaction tank 50 in the gas generator G. Namely an increase in loading results in increasing the amount of consumption of gaseous hydrogen in the stack of fuel cells FC, and the gas generator G carries out the autonomous feedback control of the amount of gas production, according to the increase in consumption.

When the output from the stack of fuel cells FC is decreased with a decrease in loading, a smaller amount of gaseous hydrogen is required for generation of electricity in the stack of fuel cells FC. As mentioned above, the gaseous fuel discharge conduit 142 connecting with the stack of fuel cells FC is generally closed by the back-pressure control valve 144. The decrease in output causes the gaseous hydrogen existing in the passage between the gas generator G and the discharge ends of the flow paths 14P of gaseous hydrogen to be not sufficiently consumed. This raises the gas pressure and decreases the amount of the gas produced by the preliminary reaction tank 30 and the reaction tank 50 in the gas generator G. Namely a decrease in loading results in decreasing the amount of consumption of gaseous hydrogen in the stack of fuel cells FC, and the gas generator G carries out the autonomous feedback control of the amount of gas production, according to the decrease in consumption.

In this manner, in the fuel cell-based generator system 140 of the fourth embodiment, the amount of gas production by the gas generator G is autonomously regulated according to the amount of gas consumption in the stack of fuel cells FC. This enables the gas generator G to produce an appropriate amount of gaseous fuel according to the operating condition of the stack of fuel cells PC. The fuel cell-based generator system 140 does not have any electronics-based forcible regulator of gas production, and thus realizes a favorably simplified structure.

In the structure of the fourth embodiment, a simple on-off valve may be used, in place of the back-pressure control valve 144. The on-off valve is in a closed position during the operation of the stack of fuel cells FC, in order to maintain the internal pressure of the passage between the gas generator G and the discharge ends of the flow paths 14P of gaseous hydrogen at a fixed level. This modified structure exerts the same effects as those of the fourth embodiment.

The cooling water circulation path 5 of the first embodiment may be added to the structure of the fourth embodiment. Like the first embodiment, this modified structure enables the preliminary reaction tank 30 and the reaction tank 50 in the gas generator G to be heated by the hot exhaust from the stack of fuel cells FC, thereby enhancing the energy efficiency.

Figure 12:
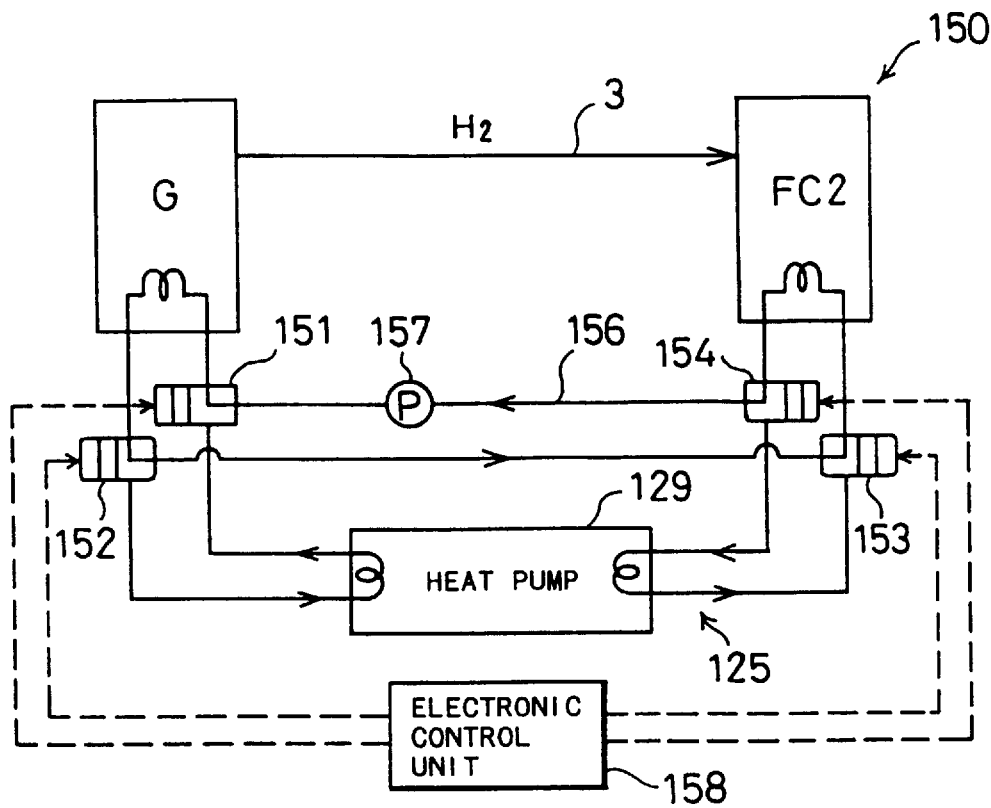
FIG. 12 is a block diagram schematically illustrating structure of a fuel cell-based generator system 150 as a fifth embodiment according to the present invention.

FIG. 12 is a block diagram schematically illustrating structure of a fuel cell-based generator system 150 as a fifth embodiment according to the present invention. Referring to FIG. 12, the fuel cell-based generator system 150 of the fifth embodiment includes--the gas generator G, the stack of fuel cells FC2, the gaseous fuel supply conduit 3, the cooling water circulation path 125, and the heat pump 129, which are identical with those of the fuel cell-based generator system 120 of the second embodiment. The fuel cell-based generator system 150 further includes a by-pass 156 that connects with the cooling water circulation path 125 and bypasses the heat pump 129, and flow path-switching valves 151 through 154 arranged at the respective intersections of the by-pass 156 and the cooling water circulation path 125. A circulation pump 157 is disposed in the middle of the by-pass 156.

The flow path-switching valves 151 through 154 switch the flow path of cooling water between the cooling water circulation path 125 via the heat pump 129 and the by-pass 156. These valves 151 through 154 are switched between a first position for making the cooling water flow through the cooling water circulation path 125 and a second position for making the cooling water flow through the by-pass 156, in response to a control signal from an electronic control unit 158

The electronic control unit 158 is constructed as a logic circuit including a microcomputer, and has known elements, such as a CPU, a ROM, a RAM, and an input/output circuit. The electronic control unit 158 changes the positions of the respective flow path-switching valves 151 through 154 based on the state of the stack of fuel cells FC2 (in operation or at a stop), thereby switching the flow path of cooling water between the passage running through the heat pump 129 and the passage bypassing the heat pump 129.

Figure 13:
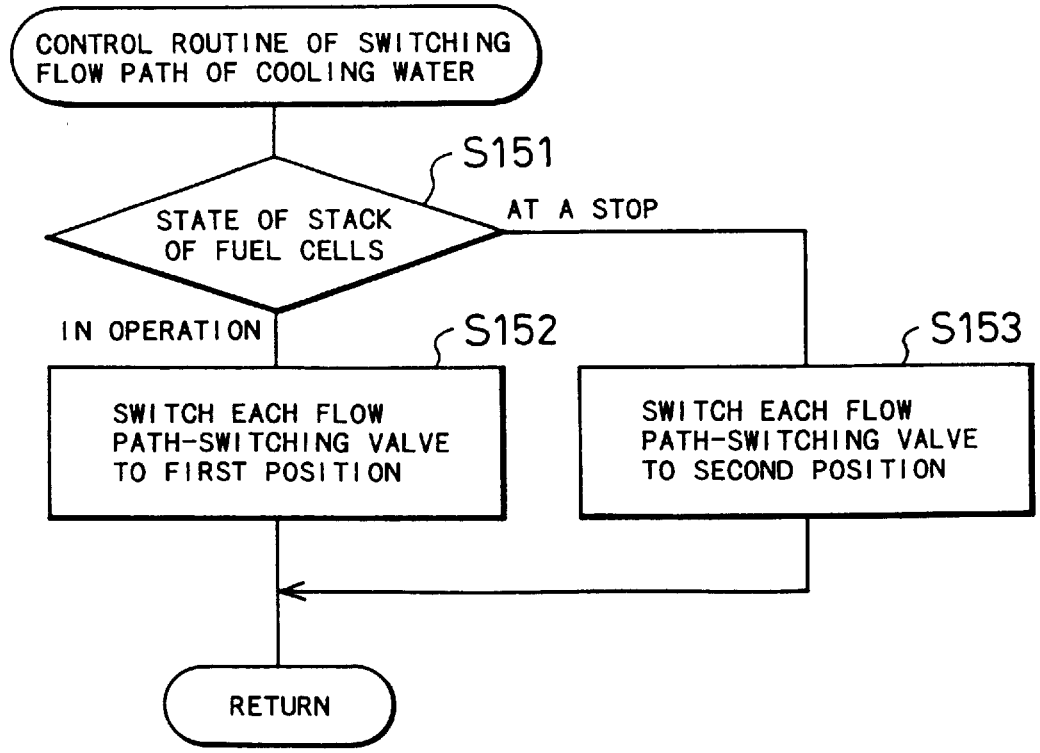
FIG. 13 is a flowchart showing a control routine of switching the flow path of cooling water executed by the CPU of the electronic control unit 158 in the fifth embodiment.

FIG. 13 is a flowchart showing a control routine of switching the flow path of cooling water executed by the CPU of the electronic control unit 158.

When the program enters the routine of FIG. 13, the CPU of the electronic control unit 158 determines whether the stack of fuel cells FC2 is in operation or at a stop at step S151. The determination is, for example, based on a signal from a fuel cells-activating switch (not shown). When the stack of fuel cells FC is determined to be in operation at step S151, the respective flow path-switching valves 151 through 154 are changed to the first position at step S152, in order to make the cooling water flow through the cooling water circulation path 125 via the heat pump 129. When the stack of fuel cells FC is determined to be at a stop at step S151, on the contrary, the respective flow path-switching valves 151 through 154 are changed to the second position at step S153, in order to make the cooling water flow through the by-pass 156.

After execution of either step S152 or S153, the program goes to RETURN and exits from this routine.

In the fuel cell-based generator system 150 of the fifth embodiment constructed as above, while the stack of fuel cells FC2 is in operation, the cooling water running through the stack of fuel cells FC2 is heated by the heat pump 129 prior to being fed into the gas generator G. While the stack of fuel cells FC2 is at a stop, on the other hand, the cooling water running through the stack of fuel cells FC2 is fed into the gas generator G without heating. In case that the stack of fuel cells FC2 is at a stop, the low-temperature cooling water is directly supplied to the gas generator G without being heated by the heat pump 129, so as to cool down the reaction tanks 30 and 50 in the gas generator G and stop the production of the reaction gas in the reaction tanks 30 and 50 without delay. This structure enables the gas production to be quickly ceased while the stack of fuel cells FC2 is at a stop.

Figure 14:
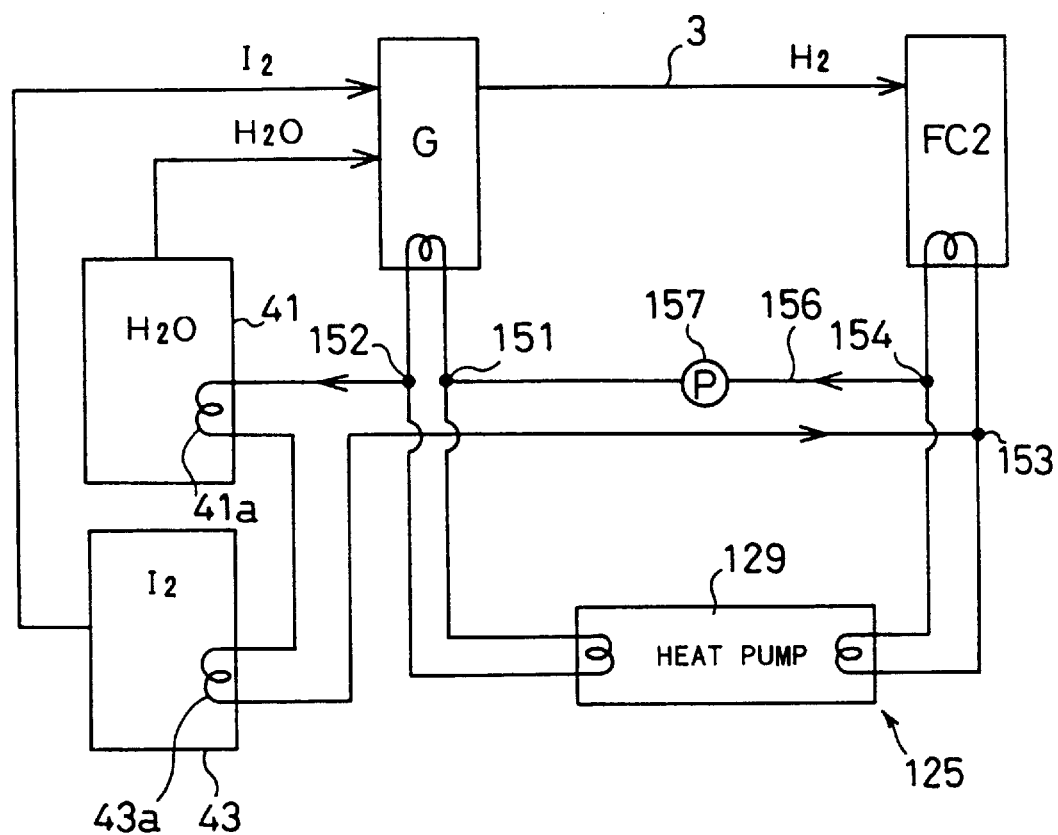
FIG. 14 schematically illustrates structure of another fuel cell-based generator system as a modification of the fifth embodiment.

In the structure of the fifth embodiment, while the stack of fuel cells FC2 is at a stop, the cooling water is fed from the stack of fuel cells FC2 via the by-pass 156 to the gas generator G. As shown in FIG. 14, in accordance with another possible structure, the by-pass 156 further connects with conduits 41a and 43a formed in the halogen tank 41 and the water tank 43, so as to enable the cooling water to be circulated around the halogen tank 41 and the water tank 43 as well as in the gas generator G. In the drawing of FIG. 14, the same elements as those of the fifth embodiment are expressed by like numerals and symbols. Like the fifth embodiment, the flow path-switching valves 151 through 154 shown by the closed circles switch the flow path of cooling water between the cooling water circulation path 125 via the heat pump 129 and the by-pass 156 bypassing the heat pump 129.

While the stack of fuel cells FC2 is at a stop, this modified structure enables the low-temperature cooling water without being heated by the heat pump 129 to be fed to the halogen tank 41 and the water tank 43 as well as the gas generator G. This cools down water and halogen, which are the materials of thermal decomposition, and further ensures a quick stop of gas production in the reaction tanks 30 and 50. Namely this structure enables the gas production to be more quickly ceased while the stack of fuel cells FC2 is at a stop.

In the above modified structure, cooling water is fed to the gas generator G, the halogen tank 41, and the water tank 43. Another possible structure may feed the cooling water to either one of the halogen tank 41 and the water tank 43 in addition to the gas generator G.

In the structure of the fifth embodiment, the cooling water running through the stack of fuel cells FC2 is heated by the heat pump 129 prior to being fed into the gas generator G, while the stack of fuel cells FC2 is in operation. It is, however, not always required to heat the gas generator G by utilizing the hot exhaust from the stack of fuel cells FC2. Additional heating means, such as electric heaters, may alternatively be used to heat the gas generator G. In this alternative structure, cooling water is fed from the stack of fuel cells FC2 to the gas generator G only when the stack of fuel cells FC2 is at a stop. This structure enables the additional heating means to be quickly ceased while the stack of fuel cells FC2 is at a stop. In this alternative structure, cooling water running through the stack of fuel cells FC2 may be fed to the halogen tank 41 and the water tank 43 as well as the gas generator G.

Figure 15:
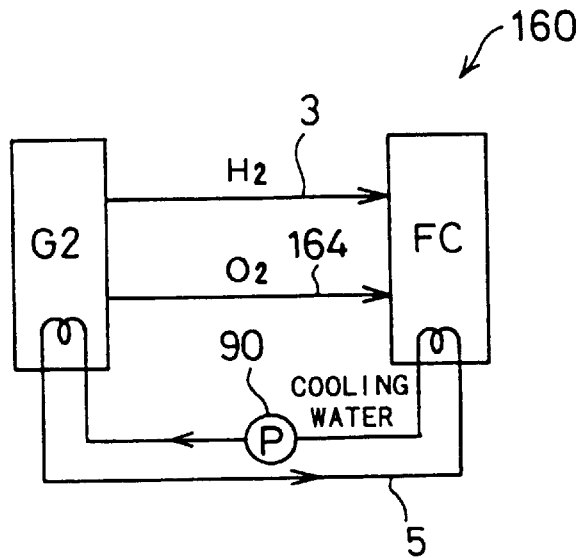
FIG. 15 is a block diagram schematically illustrating structure of a fuel cell-based generator system 160 as a sixth embodiment according to the present invention.

FIG. 15 is a block diagram schematically illustrating structure of a fuel cell-based generator system 160 as a sixth embodiment according to the present invention. Referring to FIG. 15, the fuel cell-based generator system 160 of the sixth embodiment includes a gas generator G2, the stack of fuel cells FC, the gaseous fuel supply conduit 3, the cooling water circulation path 5, and an oxygen supply conduit 164. The stack of fuel cells FC, the gaseous fuel supply conduit 3, and the cooling water circulation path 5 are identical with those of the first embodiment. The only difference from the first embodiment is the structure of the gas generator G2 and the oxygen supply conduit 164 for feeding oxygen produced by the gas generator G2 to the stack of fuel cells FC.

Figure 16:
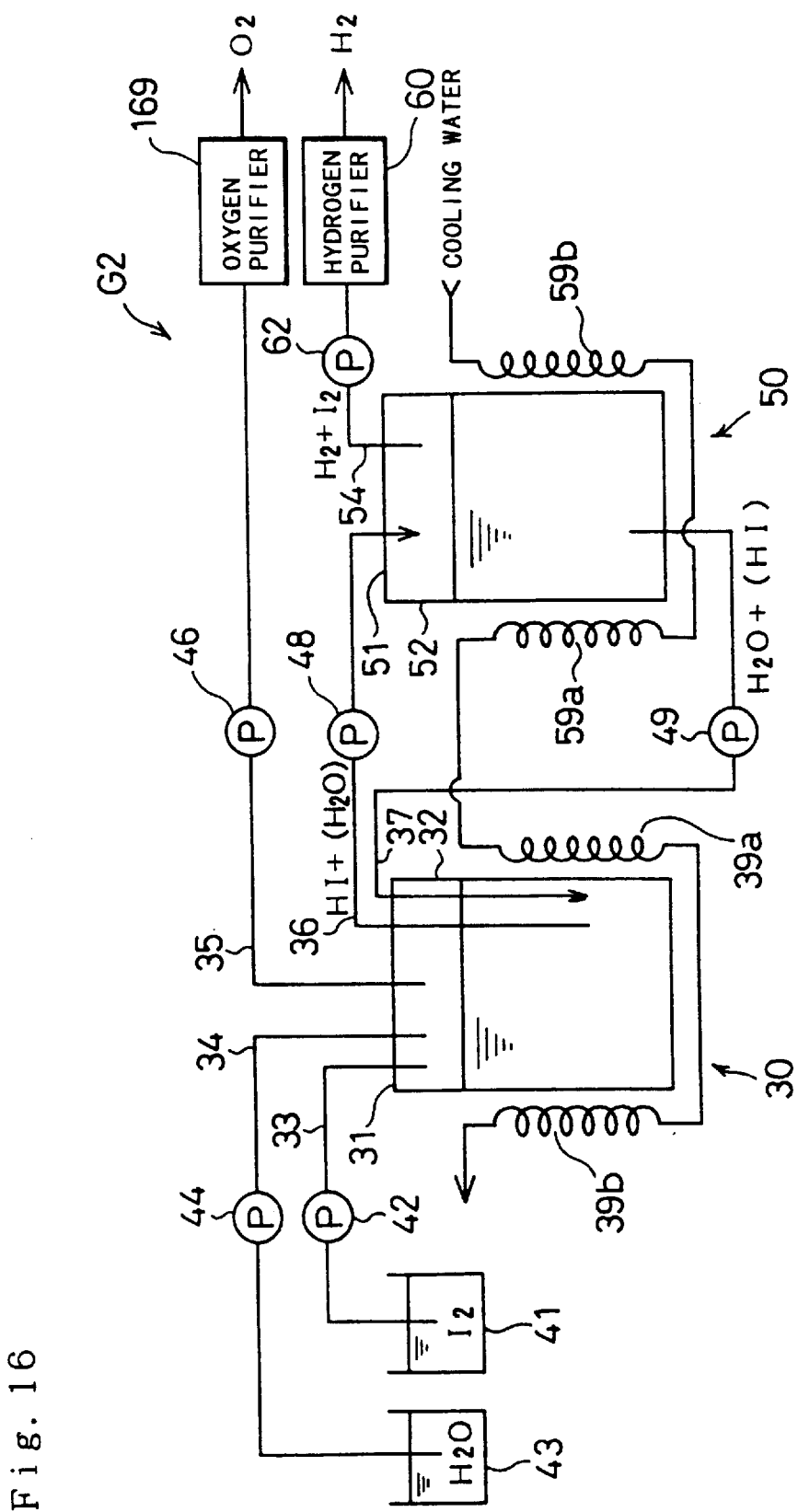
FIG. 16 schematically illustrates structure of the gas generator G2 in the sixth embodiment.

FIG. 16 schematically illustrates structure of the gas generator G2 in the sixth embodiment. Referring to FIG. 16, the gas generator G2 has the same constituents as those of the gas generator G of the first embodiment (shown by like numerals and symbols), except that an oxygen purifier 169 is disposed in the vicinity of the outlet of the third conduit 35.

The oxygen purifier 169 separates $O_2$ from the gas fed from the preliminary reaction tank 30 via the third conduit 35, and includes an oxygen filter having a filtration membrane that selectively allows permeation of oxygen. The gas fed from the preliminary reaction tank 30 via the third conduit 35 is limited to $O_2$ in principle, but is actually contaminated with halogen or halohydric acid. The oxygen purifier 169 strictly separates only $O_2$.

In the fuel cell-based generator system 160 of the sixth embodiment, both oxygen produced in the preliminary reaction tank 30 and hydrogen produced in the reaction tank 50 are supplied from the gas generator G2 to the stack of fuel cells FC. This structure further enhances the energy efficiency of the whole fuel cell-based generator system 160.

Figure 17:
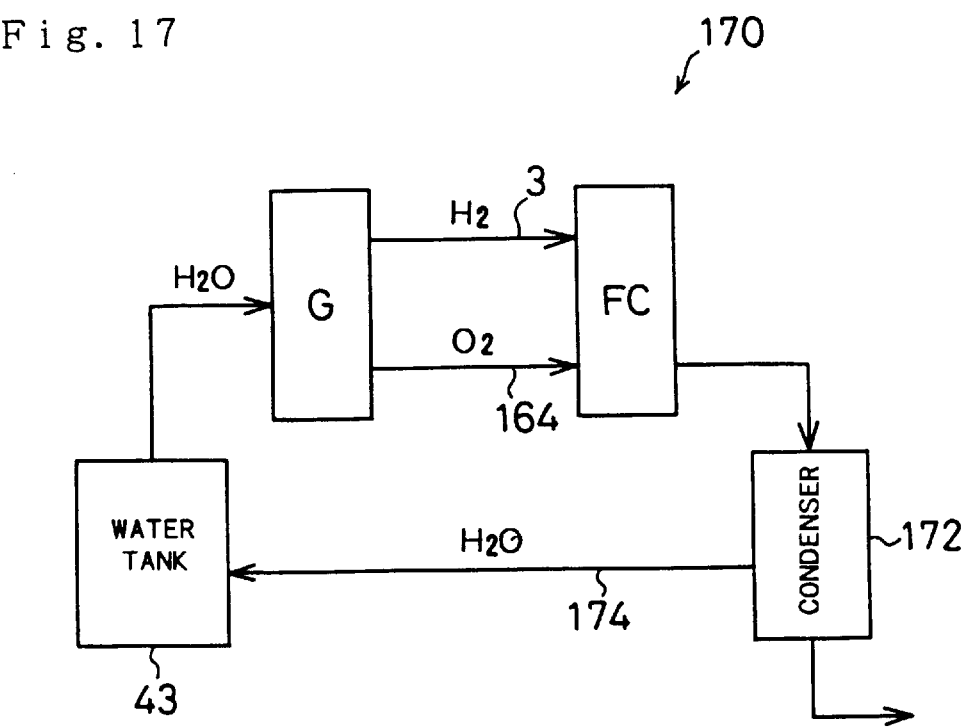
FIG. 17 is a block diagram schematically illustrating structure of a fuel cell-based generator system 170 as a seventh embodiment according to the present invention.

FIG. 17 is a block diagram schematically illustrating structure of a fuel cell-based generator system 170 as a seventh embodiment according to the present invention. Referring to FIG. 17, the fuel cell-based generator system 170 of the seventh embodiment includes the gas generator G2, the stack of fuel cells FC, the gaseous fuel supply conduit 3, the oxygen supply conduit 164, and the cooling water circulation path (not shown), which are identical with those of the sixth embodiment. The fuel cell-based generator system 170 further includes a condenser 172 disposed at the discharge ends of the plurality of flow paths 15P of oxygen defined by the cathodes 13 and the separators 21 in the stack of fuel cells FC.

The condenser 172 condenses water vapor to produce water, and recovers water vapor, which is generated at the cathodes in the stack of fuel cells FC accompanied by generation of electricity, as liquid water. The outlet of the condenser 172 is connected to the water tank 43 for supplying water to the gas generator G2 (identical with the water tank 43 in the first embodiment) via a water feed conduit 174, so that water produced by the condenser 172 is supplied to the water tank 43. In the course of operation of the stack of fuel cells FC, the materials required for the thermal decomposition are successively supplied to the gas generator G2. This reduces the required size of the water tank 43 and the required amount of water reserve. This structure also prevents the exhaust gas from the cathodes in the stack of fuel cells FC from causing white fumes in the atmosphere.

Figure 18:
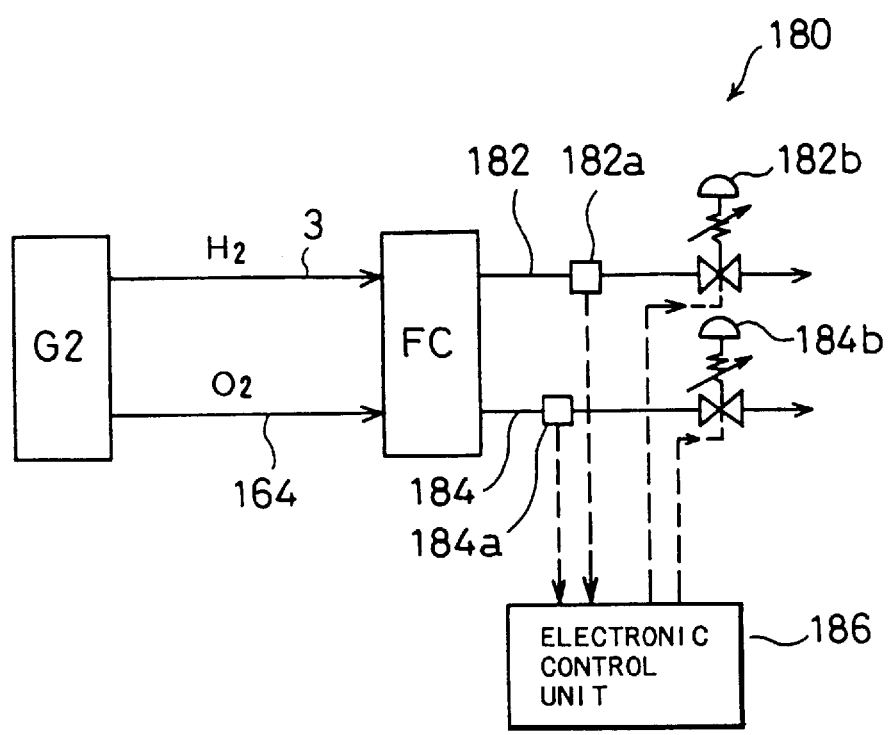
FIG. 18 is a block diagram schematically illustrating structure of a fuel cell-based generator system 180 as an eighth embodiment according to the present invention.

FIG. 18 is a block diagram schematically illustrating structure of a fuel cell-based generator system 180 as an eighth embodiment according to the present invention. Referring to FIG. 18, the fuel cell-based generator system 180 of the eighth embodiment includes the gas generator G2, the stack of fuel cells FC, the gaseous fuel supply conduit 3, the oxygen supply conduit 164, and the cooling water circulation path (not shown), which are identical with those of the sixth embodiment. The fuel cell-based generator system 180 further includes a hydrogen discharge path 182 at the discharge ends of the flow paths 14P of gaseous hydrogen in the stack of fuel cells FC and an oxygen discharge path 184 at the discharge ends of the flow paths 15P of oxygen. The remaining gases from the stack of fuel cells FC are accordingly discharged through the discharge paths 182 and 184. The hydrogen discharge path 182 is provided with a first pressure sensor 182a and a first back-pressure control valve 182b, whereas the oxygen discharge path 184 is provided with a second pressure sensor 184a and a second back-pressure control valve 184b.

The first and the second pressure sensors 182a and 184a are disposed respectively at the gas outlets on the side of the anode 12 and on the side of the cathode 13, and are electrically connected to an electronic control unit 186. The first and the second back-pressure control valves 182b and 184b for regulating the valve positions in the paths are also electrically connected to the electronic control unit 186 and change their valve positions in response to control signals from E9 the electronic control unit 186. The electronic control unit 186 is constructed as a logic circuit including a microcomputer, and has known elements, such as a CPU, a ROM, a RAM, and an input/output circuit. The electronic control unit 186 regulates the valve positions of the back-pressure control valves 182b and 184b, thereby keeping the pressure difference between the gas pressure in the hydrogen discharge path 182 and the gas pressure in the oxygen discharge path 184 within a predetermined range.

Figure 19:
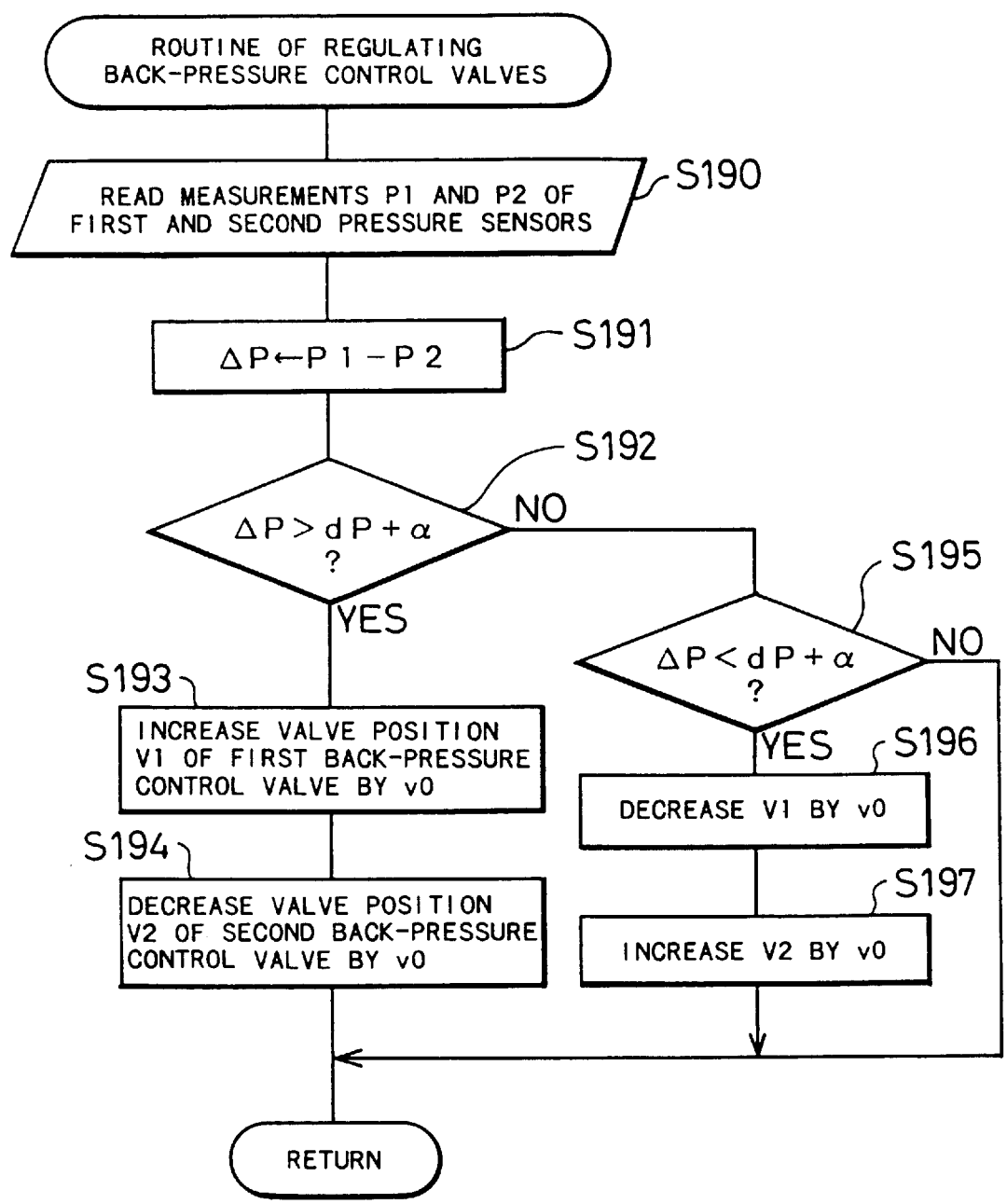
FIG. 19 is a flowchart showing a routine of regulating the back-pressure control valves executed by the CPU of the electronic control unit 186 in the eighth embodiment.

FIG. 19 is a flowchart showing a routine of regulating the back-pressure control valves executed by the CPU of the electronic control unit 186. The routine of regulating the back-pressure control valves is carried out repeatedly at predetermined time intervals by the CPU of the electronic control unit 186.

When the program enters the routine of FIG. 19, the CPU of the electronic control unit 186 first reads measurements P1 and P2 of the first pressure sensor 182a and the second pressure sensors 184a at step S190. The CPU then subtracts the observed value P2 of the second pressure sensor 184a from the observed value P1 of the first pressure sensor 182a and stores the result of subtraction as a pressure difference $\Delta P$ at step S191. It is determined at step S192 whether or not the pressure difference $\Delta P$ is greater than the sum of a predetermined value dP and a small margin $\alpha$.

When the answer is affirmative at step S192, that is, when $\Delta P$ is determined to be greater than dP+$\alpha$, the program determines that the gas pressure in the hydrogen discharge path 182 is excessively larger than the gas pressure in the oxygen discharge conduit 184 and proceeds to steps S193 and S194. The CPU increases a valve position V1 of the first back-pressure control valve 182b by a predetermined amount v0 at step S193 so as to decrease the pressure in the hydrogen gas supply system, while decreasing a valve position V2 of the second back-pressure control valve 184b by the predetermined amount v0 at step S194 so as to increase the pressure in the oxygen supply system.

When the answer is negative at step S192, on the other hand, the program proceeds to step S195, at which it is determined whether or not the pressure difference $\Delta P$ calculated at step S191 is smaller than the difference obtained by subtracting the small margin $\alpha$ from the predetermined value dP.

When the answer is affirmative at step S195, that is, when $\Delta P$ is determined to be smaller than dP−$\alpha$, the program determines that the gas pressure in the oxygen discharge path 184 is excessively larger than the gas pressure in the hydrogen discharge conduit 182 and proceeds to steps S196 and S197. The CPU decreases the valve position V1 of the first back-pressure control valve 182b by the predetermined amount v0 at step S196 so as to increase the pressure in the hydrogen gas supply system, while increasing the valve position V2 of the second backpressure control valve 184b by the predetermined amount v0 at step S197 so as to decrease the pressure in the oxygen supply system.

A After execution of either step S194 or step S197, the program goes to RETURN and exits from this routine. When the answer is negative at step S195, the pressure difference ΔP is kept within a specific range around the predetermined value dP. In this case, the program determines that no change is required for the valve positions of the first and the second back-pressure control valves 182b and 184b and goes to RETURN to exit from the routine.

The procedure of regulating the back-pressure control valves executed by the electronic control unit 186 enables the pressure difference ΔP between the gas pressure P1 in the hydrogen discharge path 182 and the gas pressure P2 in the oxygen discharge path 184 to be kept in a specific range of (dP−α) to (dP+α). The specific range of (dP−α) to (dP+α) is experimentally determined in advance, in order to enable the ratio of the gas flow in the hydrogen supply system to the gas flow in the oxygen supply system from the gas generator G2 to the stack of fuel cells FC to coincide with the ratio of hydrogen to oxygen consumed in the stack of fuel cells FC.

As discussed above, in the fuel cell-based generator system 180 of the eighth embodiment, the pressure difference ΔP between the gas pressure P1 in the hydrogen discharge path 182 and the gas pressure P2 in the oxygen discharge path 184 is kept within the range specified above. This structure regulates the gas flows in both the gaseous fuel supply system and the oxygen supply system, and enables hydrogen and oxygen produced by the gas generator G2 to be consumed in proper quantities by the stack of fuel cells FC. This enhances the energy efficiency of the whole fuel cell-based generator system 180. This structure prevents the pressure difference out of the specific range from occurring between the hydrogen supply system and the oxygen supply system, thereby ensuring the safety of the fuel cell-based generator system 180.

Figure 20:
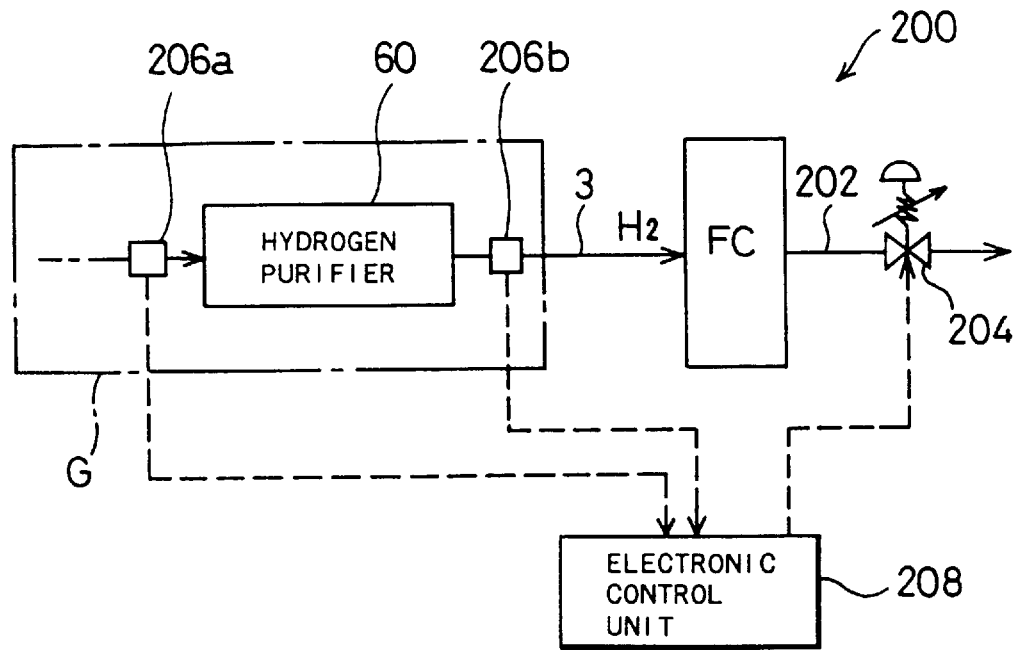
FIG. 20 is a block diagram schematically illustrating structure of a fuel cell-based generator system 200 as a ninth embodiment according to the present invention.

FIG. 20 is a block diagram schematically illustrating structure of a fuel cell-based generator system 200 as a ninth embodiment according to the present invention. Referring to FIG. 20, the fuel cell-based generator system 200 of the ninth embodiment includes the gas generator G, the stack of fuel cells FC, the gaseous fuel supply conduit 3, and the cooling water circulation path (not shown), which are identical with those of the first embodiment. The fuel cell-based generator system 200 further includes a hydrogen discharge path 202 at the discharge ends of the flow paths 14P of gaseous hydrogen in the stack of fuel cells FC. The remaining hydrogen from the stack of fuel cells FC is discharged through the hydrogen discharge path 202. A back-pressure control valve 204 is disposed in the hydrogen discharge path 202.

A first pressure sensor 206a and a second pressure sensor 206b are respectively disposed before and after the hydrogen purifier 60 in the gas generator G. These pressure sensors 206a and 206b are electrically connected to an electronic control unit 208. The back-pressure control valve 204 for regulating the valve position in the path is also electrically connected to the electronic control unit 208 and changes its valve position in response to a control signal from the electronic control unit 208. The electronic control unit 208 is constructed as a logic circuit including a microcomputer, and has known elements, such as a CPU, a ROM, a RAM, and an input/output circuit. The electronic control unit 208 regulates the valve position of the back-pressure control valve 204, thereby keeping the pressure difference between the gas pressure at the inlet of the hydrogen purifier 60 and the gas pressure at the outlet of the hydrogen purifier 60 within a predetermined range.

Figure 21:
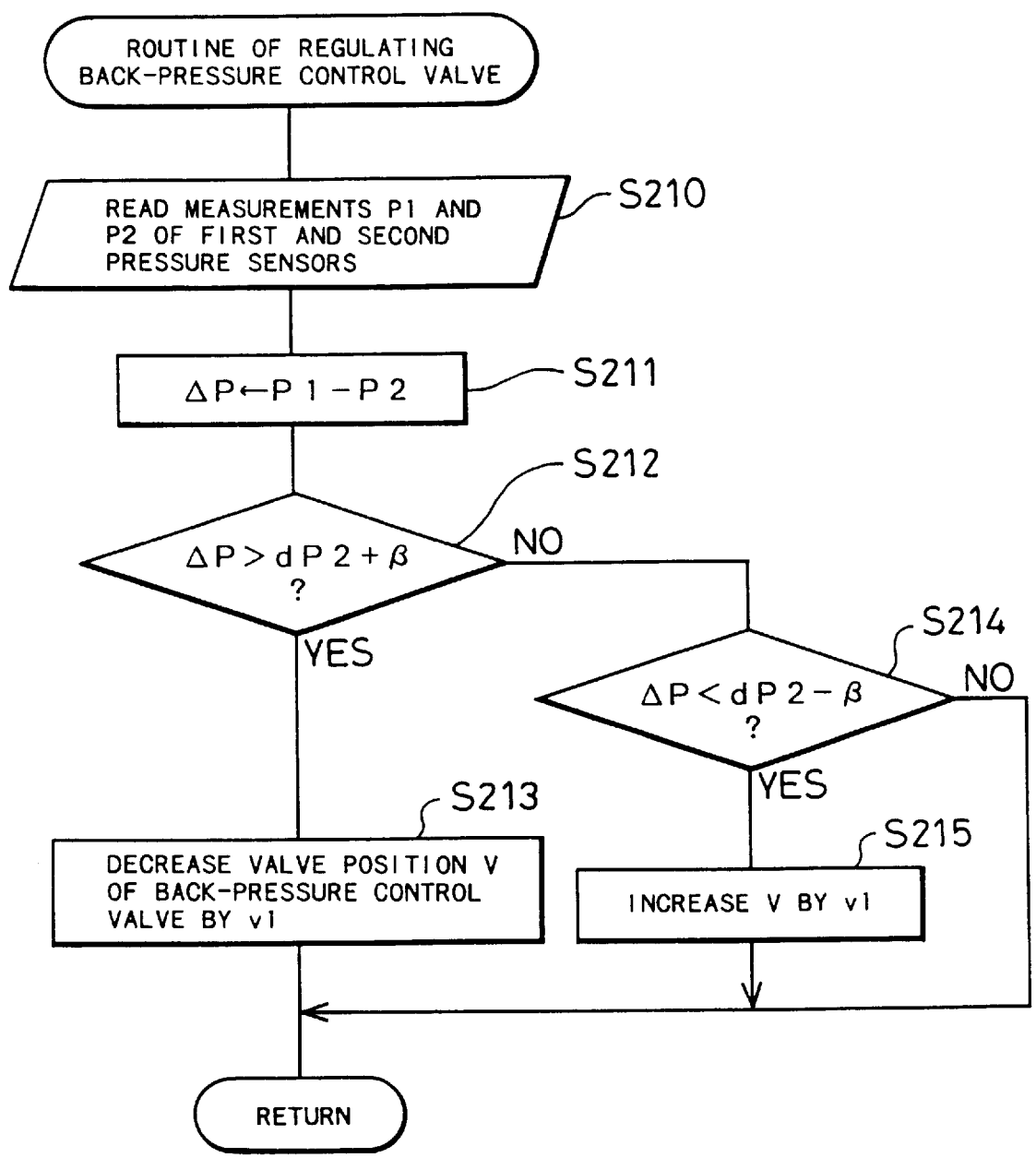
FIG. 21 is a flowchart showing a routine of regulating the back-pressure control valve executed by the CPU of the electronic control unit 208 in the ninth embodiment.

FIG. 21 is a flowchart showing a routine of regulating the back-pressure control valve executed by the CPU of the electronic control unit 208. The routine of regulating the back-pressure control valve is carried out repeatedly at predetermined time intervals by the CPU of the electronic control unit 208.

When the program enters the routine of FIG. 21, the CPU of the electronic control unit 208 first reads measurements P1 and P2 of the first pressure sensor 206a and the second pressure sensors 206b at step S210. The CPU then subtracts the observed value P2 of the second pressure sensor 206b from the observed value P1 of the first pressure sensor 206a and stores the result of subtraction as a pressure difference ΔP at step S211. It is determined at step S212 whether or not the pressure difference ΔP is greater than the sum of a predetermined value dP2 and a small margin β.

When the answer is affirmative at step S212, that is, when ΔP is determined to be greater than dP2+β, the program determines that the gas pressure at the inlet of the hydrogen purifier 60 is excessively larger than the gas pressure at the outlet of the hydrogen purifier 60 and proceeds to step S213. The CPU decreases a valve position V of the back-pressure control valve 204 by a predetermined amount v1 at step S213, so as to increase the gas pressure at the outlet of the hydrogen purifier 60.

When the answer is negative at step S212, on the other hand, the program proceeds to step S214, at which it is determined whether or not the pressure difference ΔP calculated at step S211 is smaller than the difference obtained by subtracting the small margin β from the predetermined value dP2.

When the answer is affirmative at step S214, that is, when ΔP is determined to be smaller than dP2−β, the program determines that the gas pressure at the outlet of the hydrogen purifier 60 is excessively larger than the gas pressure at the inlet of the hydrogen purifier 60 and proceeds to step S215. The CPU increases the valve position V of the back-pressure control valve 204 by the predetermined amount v1 at step S215, so as to decrease the pressure at the outlet of the hydrogen purifier 60.

After execution of either step S213 or step S215, the program goes to RETURN and exits from this routine. When the answer is negative at step S214, the pressure difference ΔP is kept within a specific range around the predetermined value dP2. In this case, the program determines that no change is required for the valve position of the back-pressure control valve 204 and goes to RETURN to exit from the routine.

The procedure of regulating the back-pressure control valve executed by the electronic control unit 208 enables the pressure difference ΔP between the gas pressure P1 at the inlet of the hydrogen purifier 60 and the gas pressure P2 at the outlet of the hydrogen purifier 60 to be kept in a specific range of (dP2−β) to (dP2+β). The specific range of (dP2−β) to (dP2+β) represents the pressure difference required for the hydrogen filtration membrane in the hydrogen purifier 60 to keep the stable amount of hydrogen production and is experimentally determined in advance.

As discussed above, in the fuel cell-based generator system 200 of the ninth embodiment, the pressure difference ΔP between the gas pressure P1 at the inlet of the hydrogen purifier 60 and the gas pressure P2 at the outlet of the hydrogen purifier 60 is kept within the range specified above. This structure enables a desired amount of hydrogen to be continuously and stably supplied by the hydrogen purifier 60.

Figure 22:
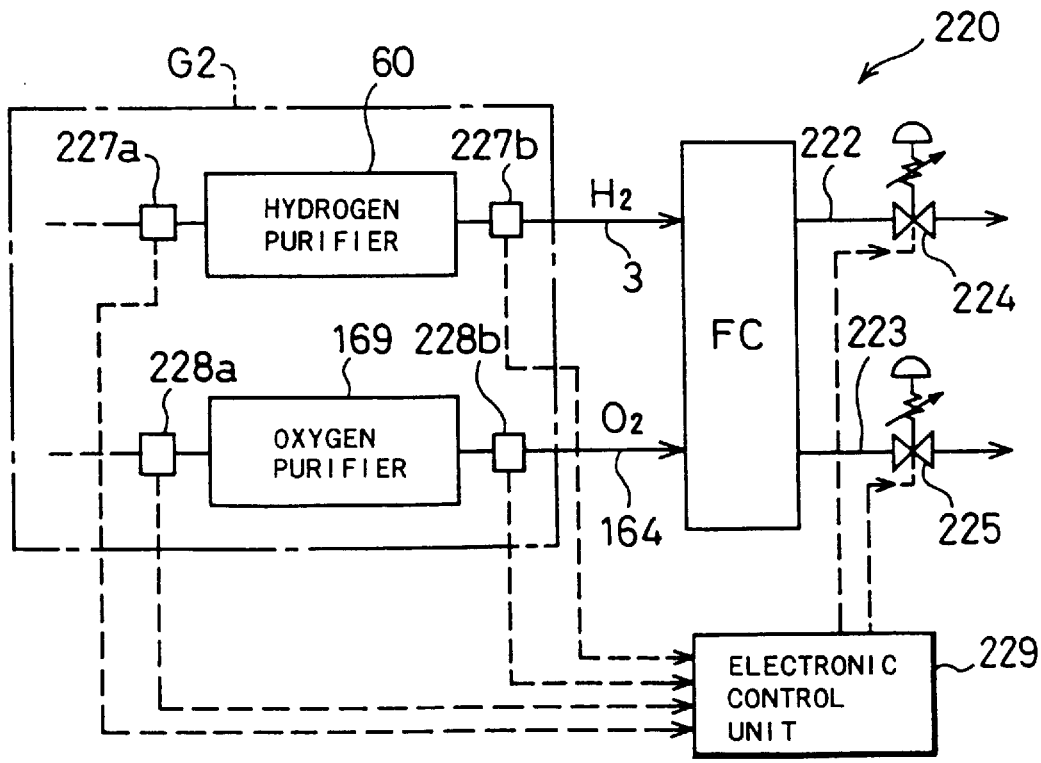
FIG. 22 is a block diagram schematically illustrating structure of a fuel cell-based generator system 220 as a tenth embodiment according to the present invention.

FIG. 22 is a block diagram schematically illustrating structure of a fuel cell-based generator system 220 as a tenth embodiment according to the present invention. The fuel cell-based generator system 220 of the tenth embodiment has the structure related to the hydrogen supply system in the ninth embodiment for both the hydrogen supply system and the oxygen supply system. Referring to FIG. 22, the fuel cell-based generator system 220 includes the gas generator G2, the stack of fuel cells FC, the gaseous fuel supply conduit 3, the oxygen supply conduit 164, and the cooling water circulation path (not shown), which are identical with those of the sixth embodiment. The fuel cell-based generator system 220 further includes a hydrogen discharge path 222 at the discharge ends of the flow paths 14P of gaseous hydrogen in the stack of fuel cells FC and an oxygen discharge path 223 at the discharge ends of the flow paths 15P of oxygen. The remaining gases from the stack of fuel cells FC are accordingly discharged through the discharge paths 222 and 223. The hydrogen discharge path 222 and the oxygen discharge path 223 are respectively provided with a first back-pressure control valve 224 and a second back-pressure control valve 225.

A first pressure sensor 227a and a second pressure sensor 227b are respectively disposed before and after the hydrogen purifier 60 in the gas generator G2. A third pressure sensor 228a and a fourth pressure sensor 228b are respectively disposed before and after the oxygen purifier 169 in the gas generator G2. These pressure sensors 227a, 227b, 228a, and 228b are electrically connected to an electronic control unit 229.

The first and the second back-pressure control valves 224 and 225 for regulating the valve positions in the paths are also electrically connected to the electronic control unit 229 and change their valve positions in response to control signals from the electronic control unit 229. The electronic control unit 229 is constructed as a logic circuit including a microcomputer, and has known elements, such as a CPU, a ROM, a RAM, and an input/output circuit. In the same manner as the control procedure of the ninth embodiment, the electronic control unit 229 regulates the valve position of the first back-pressure control valve 224, thereby keeping the pressure difference between the gas pressure at the inlet of the hydrogen purifier 60 and the gas pressure at the outlet of the hydrogen purifier 60 within a predetermined range. In the same manner as the ninth embodiment, the electronic control unit 229 regulates the valve position of the second back-pressure control valve 225, thereby keeping the pressure difference between the gas pressure at the inlet of the oxygen purifier 169 and the gas pressure at the outlet of the oxygen purifier 169 within a predetermined range.

The structure of the tenth embodiment independently controls the hydrogen supply system and the oxygen supply system and keeps both the pressure difference between the inlet and the outlet of the hydrogen purifier 60 and the pressure difference between the inlet and the outlet of the oxygen purifier 169 within the respective predetermined ranges. This structure enables a desired amount of hydrogen to be continuously and stably supplied by the hydrogen purifier 60, while enabling a desired amount of oxygen to be continuously and stably supplied by the oxygen purifier 169.

The control procedure executed by the electronic control unit 229 of the tenth embodiment may be modified in the following manner. The CPU of the electronic control unit 229 calculates a first pressure difference $\Delta P1$ before and after the hydrogen purifier 60 based on the measurements of the first pressure sensor 227a and the second pressure sensor 227b, and calculates a second pressure difference $\Delta P2$ before and after the oxygen purifier 169 based on the measurements of the third pressure sensor 228a and the fourth pressure sensor 228b. Thedifference between the first pressure difference $\Delta P1$ and the second pressure difference $\Delta P2$ is then defined as $\Delta P$. The CPU regulates the valve positions of the first and the second back-pressure control valves 224 and 225 based on the difference $\Delta P$. This procedure is identical with the processes after step S192 in the flowchart of FIG. 19 of the eighth embodiment.

Like the eighth embodiment, this modified structure can appropriately regulate the ratio of the gas flow in the gaseous fuel supply system to the gas flow in the oxygen supply system. This structure enables hydrogen and oxygen produced by the gas generator G2 to be consumed in proper quantities by the stack of fuel cells FC.

Figure 23:
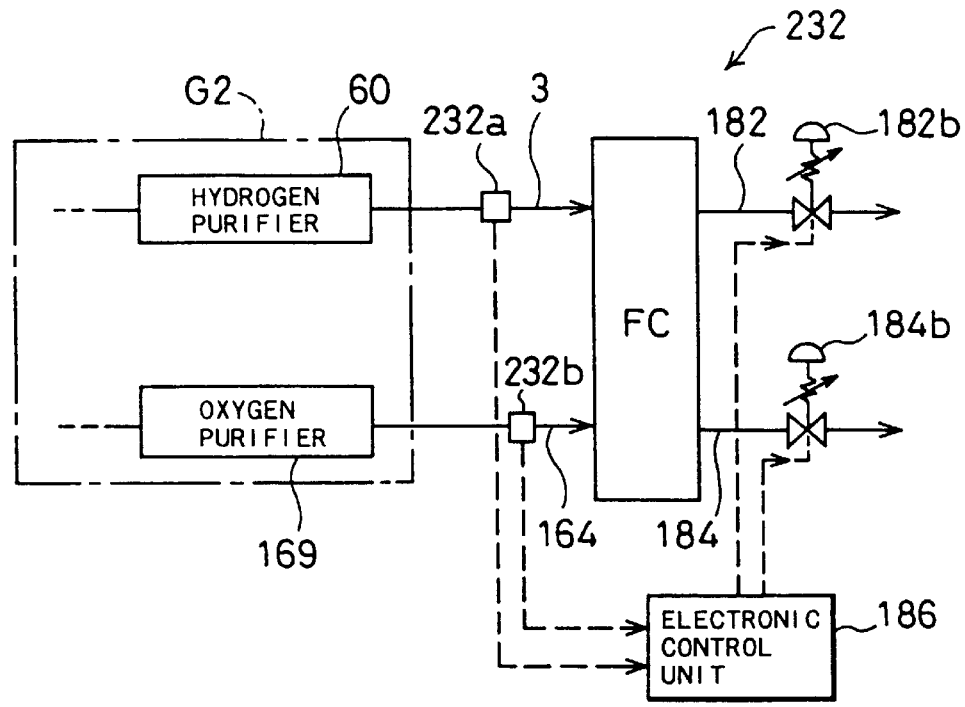
FIG. 23 is a block diagram schematically illustrating structure of a fuel cell-based generator system 230 as an eleventh embodiment according to the present invention.

FIG. 23 is a block diagram schematically illustrating structure of a fuel cell-based generator system 230 as an eleventh embodiment according to the present invention. Referring to FIG. 23, the fuel cell-based generator system 230 of the eleventh embodiment has a similar structure to that of the eighth embodiment shown in FIG. 18, except that the first and the second pressure sensors 182a and 184a are omitted and that a first flow sensor 232a is disposed in the middle of the gaseous fuel supply conduit 3 and a second flow sensor 232b is disposed in the middle of the oxygen supply conduit 164. In the eleventh embodiment shown in FIG. 23, the same elements as those in the eighth embodiment are expressed by like numerals and symbols.

The first and the second flow sensors 232a and 232b are electrically connected to the electronic control unit 186. The electronic control unit 186 regulates the valve positions of the first and the second back-pressure control valves 182b and 184b based on the measurements of the first and the second flow sensors 232a and 232b, thereby enabling the difference between the flow of gaseous hydrogen through the hydrogen discharge path 182 and the flow of oxygen through the oxygen discharge path 184 to be kept within a predetermined range.

The procedure of regulating the back-pressure control valves executed by the CPU of the electronic control unit 186 in the eleventh embodiment is not described specifically. Briefly speaking, the measurements P1 and P2 of the pressure sensors 182a and 184a in the flowchart of FIG. 19 of the eighth embodiment are replaced by the measurements of the flow sensors 232a and 232b, and the control is carried out to keep the difference between the measurements of the flow sensors 232a and 232b within a predetermined range.

The structure of the eleventh embodiment enables the ratio of the flow of gaseous hydrogen through the flow path at the outlet of the hydrogen purifier 60 to the flow of oxygen through the flow path at the outlet of the oxygen purifier 169 to coincide with the ratio of hydrogen to oxygen consumed by the stack of fuel cells FC. The structure accordingly enables hydrogen and oxygen produced by the gas generator G2 to be consumed in proper quantities by the stack of fuel cells FC. This enhances the energy efficiency of the whole fuel cell-based generator system 230. This structure prevents the pressure difference out of the specific range from occurring between the hydrogen supply system and the oxygen supply system, thereby ensuring the safety of the fuel cell-based generator system 230.

Figure 24:
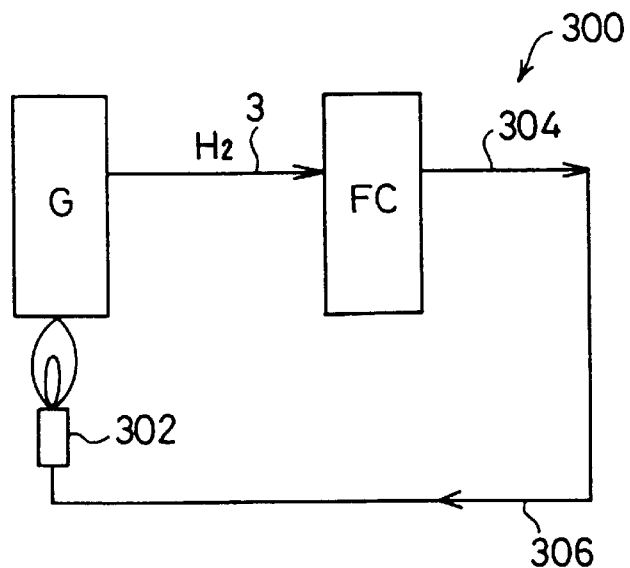
FIG. 24 is a block diagram schematically illustrating structure of a fuel cell-based generator system 300 as a twelfth embodiment according to the present invention.

FIG. 24 is a block diagram schematically illustrating structure of a fuel cell-based generator system 300 as a twelfth embodiment according to the present invention. Referring to FIG. 24, the fuel cell-based generator system 300 of the twelfth embodiment includes the gas generator G, the stack of fuel cells FC, and the gaseous fuel supply conduit 3, which are identical with those of the first embodiment. The fuel cell-based generator system 300 further includes a gas burner 302 for heating the gas generator G.

The gas burner 302 is connected to a hydrogen discharge path 304, which is formed at the discharge ends of the flow paths 14P of gaseous hydrogen in the stack of fuel cells FC, via a conduit 306. The gas burner 302 combusts the remaining hydrogen from the stack of fuel cells FC, which is discharged through the hydrogen discharge path 304. More specifically, the gas burner 302 is used to heat the preliminary reaction tank 30 and the reaction tank 50 included in the gas generator G.

In the fuel cell-based generator system 300 of the twelfth embodiment, the reaction tanks 30 and 50 in the gas generator G are heated by the remaining hydrogen from the stack of fuel cells FC. No additional fuel is thus required for the gas burner 302. This enhances the energy efficiency of the whole fuel cell-based generator system 300. A special device is generally required for treatment of the remaining hydrogen discharged from the stack of fuel cells FC. This structure, however, does not require any special device for the treatment of the remaining hydrogen, thereby simplifying the structure of the whole fuel cell-based generator system 300.

Figure 25:
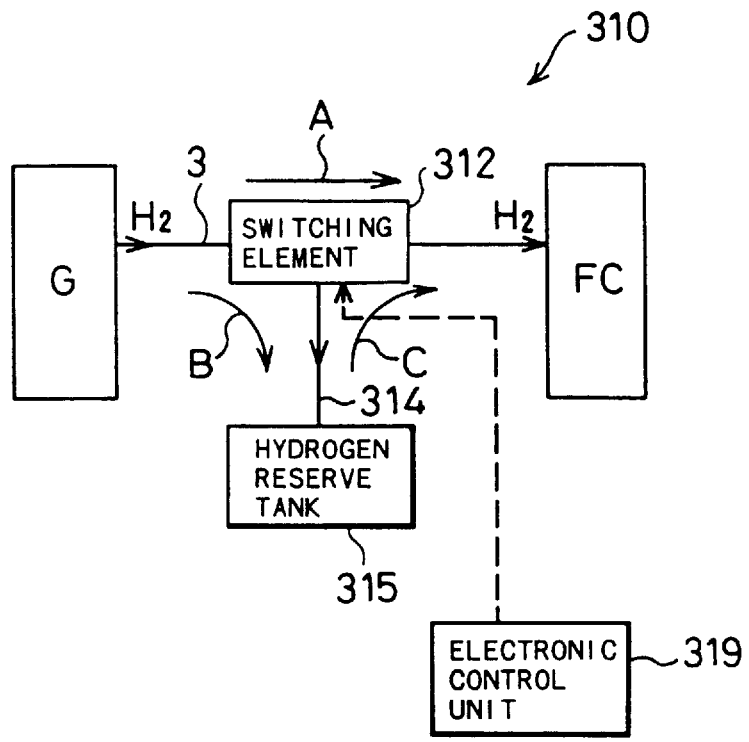
FIG. 25 is a block diagram schematically illustrating structure of a fuel cell-based generator system 310 as a thirteenth embodiment according to the present invention.

FIG. 25 is a block diagram schematically illustrating structure of a fuel cell-based generator system 310 as a thirteenth embodiment according to the present invention. Referring to FIG. 25, the fuel cell-based generator system 310 of the thirteenth embodiment includes the gas generator G, the stack of fuel cells FC, and the gaseous fuel supply conduit 3, which are identical with those of the first embodiment. The fuel cell-based generator system 310 further includes a switching element 312 in the middle of the gaseous fuel supply conduit 3. A hydrogen reserve tank 315 is connected to the switching element 312 via a conduit 314.

The switching element 312 changes the gas flow path between a direction A from the gas generator G to the stack of fuel cells FC, a direction B from the gas generator G to the hydrogen reserve tank 315, and a direction C from the hydrogen reserve tank 315 to the stack of fuel cells FC. The switching element 312 carries out the switching operation in response to a control signal output from an electronic control unit 319. Although not being illustrated in FIG. 25, pumps are actually arranged at appropriate positions to enable the gas flows in the directions A through C.

Figure 26:
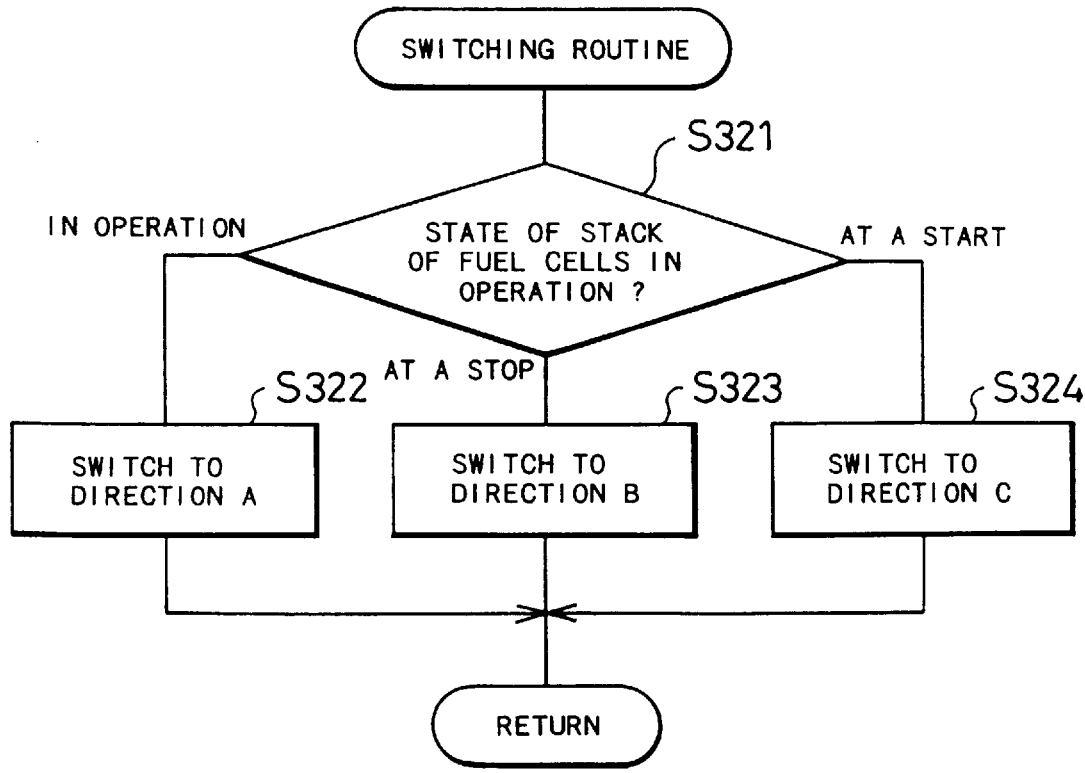
FIG. 26 is a flowchart showing a switching routine executed by the CPU of the electronic control unit 319 in the thirteenth embodiment.

FIG. 26 is a flowchart showing a switching routine of the switching element 312 executed by the CPU of the electronic control unit 319. The routine of FIG. 26 is executed repeatedly at predetermined time intervals. When the program enters the routine of FIG. 26, the CPU of the electronic control unit 319 first determines the state of the stack of fuel cells FC, that is, inoperation, atastop, oratastart, basedon, for example, the position of an external switch at step S321. When the stack of fuel cells FC is determined to be in operation, the switching element 312 is switched to the position of the direction A at step S322. When the stack of fuel cells FC is determined to be at a stop, the switching element 312 is switched to the position of the direction B at step S323. When the stack of fuel cells FC is determined to be at a start, on the other hand, the switching element 312 is switched to the position of the direction C at step S324. After execution of any one of steps S322, S323, and S324, the program goes to RETURN and exits from this routine.

While the stack of fuel cells FC is in operation, the switching element 312 is switched to the position of the direction A so as to enable a supply of gaseous fuel from the gas generator G to the stack of fuel cells FC. When the stack of fuel cells FC is at a stop, the switching element 312 is switched to the position of the direction B so as to enable a supply of gaseous fuel or gaseous hydrogen from the gas generator G to the hydrogen reserve tank 315.

At the time of stopping the generator system, the gas generator G does not stop immediately but continues producing gaseous hydrogen for a while, although the stack of fuel cells FC stops its operation without delay. The switching operation for feeding gaseous hydrogen from the gas generator G to the hydrogen reserve tank 315 allows the gaseous hydrogen produced by the gas generator G after the stop of the generator system to be effectively utilized. A modified structure carries out the control to enable a continuous operation of the gas generator G until the hydrogen reserve tank 315 is filled up, after the stack of fuel cells FC immediately stops its operation at the time of stopping the generator system.

In the fuel cell-based generator system 310 of the thirteenth embodiment, when the stack of fuel cells FC is at a start, the switching element 312 is switched to the position of the direction C so as to enable a supply of hydrogen from the hydrogen reserve tank 315 to the stack of fuel cells FC. This structure realizes the following effects.

At a start of the fuel cell-based generator system, there is generally a time lag before the gas generator G starts working sufficiently. The structure of the thirteenth embodiment enables the gaseous fuel to be supplied to the stack of fuel cells FC immediately after the start of the generator system. At a start of the fuel cell-based generator system, it is generally impossible to heat the reaction tanks 30 and 50 included in the gas generator G by taking advantage of the hot exhaust from the stack of fuel cells FC. An electric heater is accordingly required for the starting operation. The structure of the fuel cell-based generator system 310 of the thirteenth embodiment, however, enables a supply of hydrogen from the hydrogen reserve tank 315 to the stack of fuel cells FC at the start of the generator system. This structure accordingly does not require operation of the gas generator G at the starting time nor require any electric heater for the starting operation. This simplifies the structure of the whole fuel cell-based generator system 310.

In the normal driving state, the stack of fuel cells FC starts its operation. The reaction tanks 30 and 50 included in the gas generator G can thus be heated by taking advantage of the hot exhaust from the stack of fuel cells FC (structure of the first embodiment) or by combusting the remaining gaseous fuel from the stack of fuel cells FC (structure of the twelfth embodiment).

Figure 27:
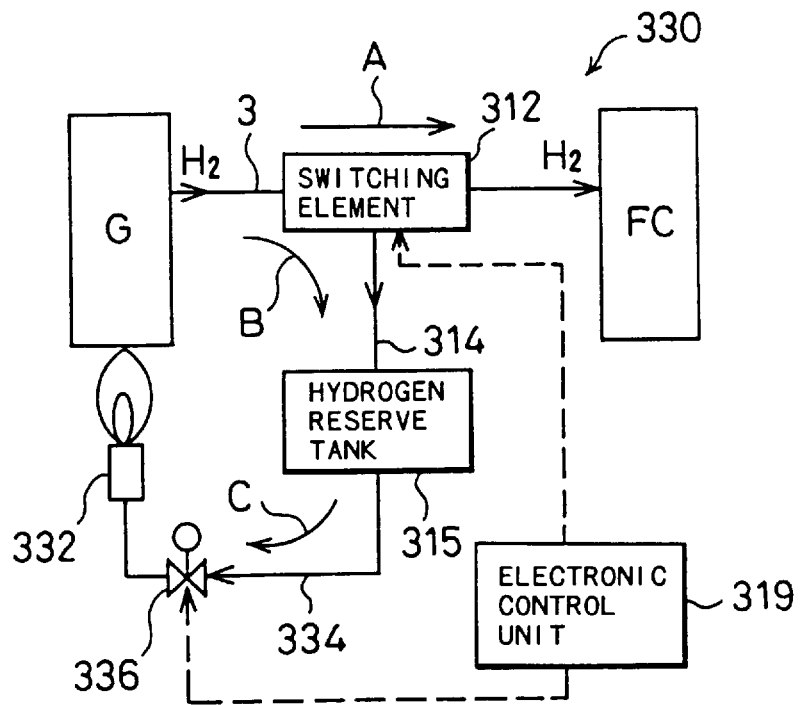
FIG. 27 is a block diagram schematically illustrating structure of a fuel cell-based generator system 330 as a fourteenth embodiment according to the present invention.

FIG. 27 is a block diagram schematically illustrating structure of a fuel cell-based generator system 330 as a fourteenth embodiment according to the present invention. Referring to FIG. 27, the fuel cell-based generator system 330 of the fourteenth embodiment has a similar structure to that of the thirteenth embodiment, except that the fourteenth embodiment includes a gas burner 332 for heating the gas generator G, a conduit 334 for connecting the hydrogen reserve tank 315 with the gas burner 332, and a solenoid valve 336 for opening and closing the conduit 334. In the fourteenth embodiment shown in FIG. 27, the same elements as those of the thirteenth embodiment are expressed by like numerals and symbols.

Like the twelfth embodiment, the gas burner 332 heats the preliminary reaction tank 30 and the reaction tank 50 included in the gas generator G. The switching element 312 changes the gas flow path between a direction A from the gas generator G to the stack of fuel cells FC and a direction B from the gas generator G to the hydrogen reserve tank 315. The switching element 312 carries out the switching operation in response to a control signal output from the electronic control unit 319. The solenoid valve 336 is electrically connected to the electronic control unit 319, and opens and closes the conduit 334 in response to a control signal from the electronic control unit 319.

Figure 28:
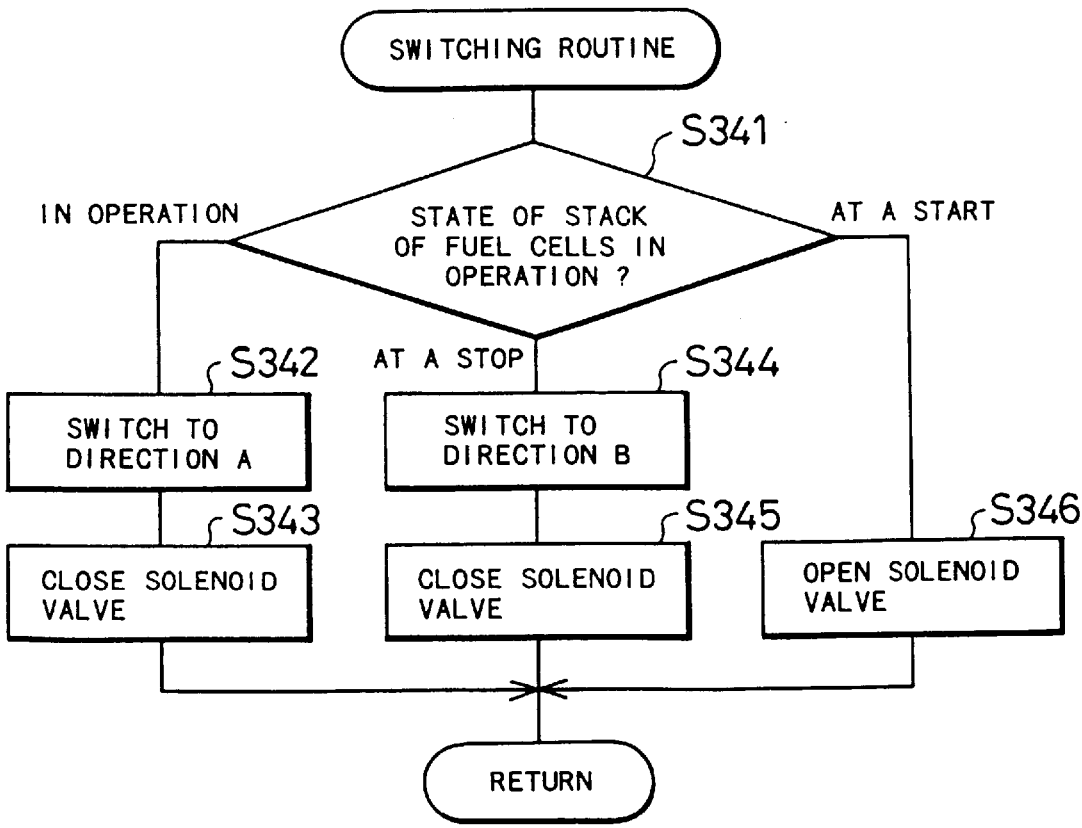
FIG. 28 is a flowchart showing a switching routine executed by the CPU of the electronic control unit 319 in the fourteenth embodiment.

FIG. 28 is a flowchart showing a switching routine of the switching element 312 executed by the CPU of the electronic control unit 319. The routine of FIG. 28 is executed repeatedly at predetermined time intervals. When the program enters the routine of FIG. 28, the CPU of the electronic control unit 319 first determines the state of the stack of fuel cells FC, that is, inoperation, atastop, oratastart, basedon, for example, the position of an external switch at step S341. When the stack of fuel cells FC is determined to be in operation, the switching element 312 is switched to the position of the direction A at step S342 and the solenoid valve 336 is switched to a closed position at step S343. When the stack of fuel cells FC is determined to be at a stop at step S341, the switching element 312 is switched to the position of the direction B at step S344 and the solenoid valve 336 is switched to the closed position at step S345. When the stack of fuel cells FC is determined to be at a start at step S341, on the other hand, the solenoid valve 336 is switched to an open position at step S346. After execution of any one of steps S343, S345, and S346, the program goes to RETURN and exits from this routine.

Like the thirteenth embodiment, while the stack of fuel cells FC is in operation, the switching element 312 is switched to the position of the direction A so as to enable a supply of gaseous fuel from the gas generator G to the stack of fuel cells FC. When the stack of fuel cells FC is at a stop, the switching element 312 is switched to the position of the direction B so as to enable a supply of gaseous hydrogen from the gas generator G to the hydrogen reserve tank 315. When the stack of fuel cells FC is at a start, on the other hand, the solenoid valve 336 is switched to the open position, and the gas burner 317 is lit by taking advantage of the gaseous hydrogen stored in the hydrogen reserve tank 315.

At a start of the fuel cell-based generator system, there is generally a time lag before the gas generator G starts working sufficiently by taking advantage of the hot exhaust from the stack of fuel cells FC. Namely a supply of fuel can not be fed to the stack of fuel cells FC immediately after the start. The structure of the fourteenth embodiment, however, has the gas burner 332 for heating the gas generator G and enabling the operation of the gas generator G immediately after the start of the generator system. This does not require any electric heater for the starting operation and thereby simplifies the structure of the whole fuel cell-based generator-system 330.

In the normal driving state, the stack of fuel cells FC starts its operation. Instead of the structure of the embodiment that utilizes the gaseous hydrogen stored in the hydrogen reserve tank 315 to light the gas burner 317, an alternative structure heats the reaction tanks 30 and 50 included in the gas generator G by taking advantage of the hot exhaust from the stack of fuel cells FC (structure of the first embodiment) or by combusting the remaining gaseous fuel from the stack of fuel cells FC (structure of the twelfth embodiment).

Figure 29:
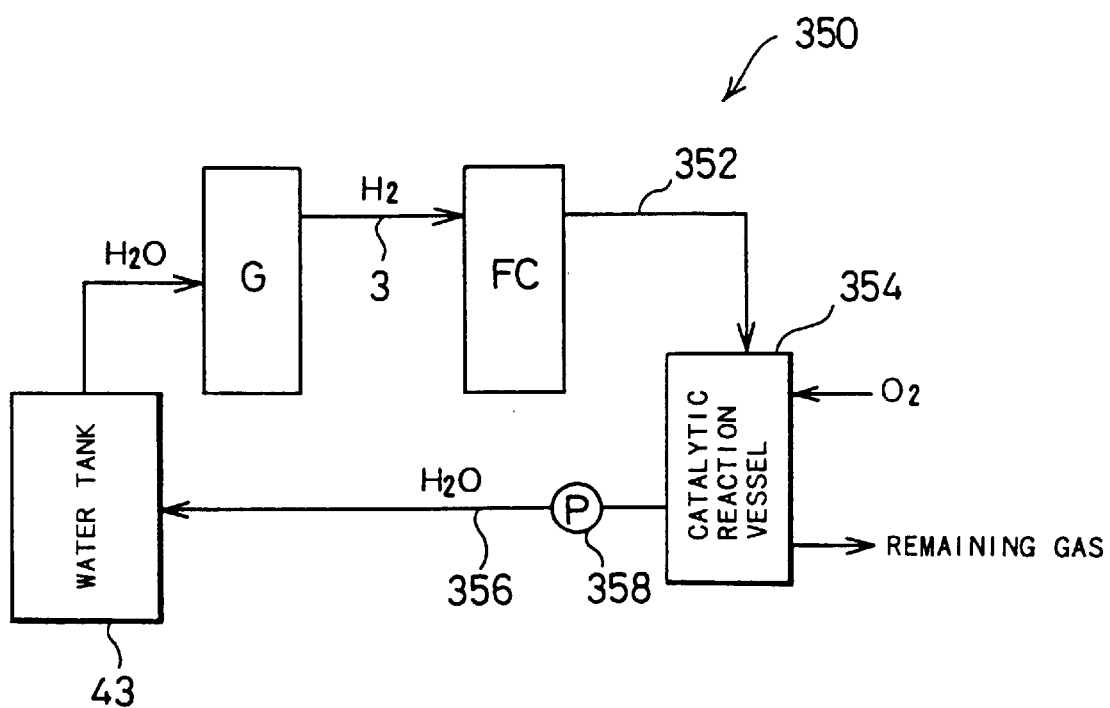
FIG. 29 is a block diagram schematically illustrating structure of a fuel cell-based generator system 350 as a fifteenth embodiment according to the present invention.

FIG. 29 is a block diagram schematically illustrating structure of a fuel cell-based generator system 350 as a fifteenth embodiment according to the present invention. Referring to FIG. 27, the fuel cell-based generator system 350 of the fifteenth embodiment includes the gas generator G. the stack of fuel cells FC, the gaseous fuel supply conduit 3, and the cooling water circulation path (not shown), which are identical with those of the first embodiment. The fuel cell-based generator system 350 further includes a hydrogen discharge path 352 at the discharge ends of the flow paths 14P of gaseous hydrogen in the stack of fuel cells FC. A catalytic reaction vessel 354 is connected to the hydrogen discharge path 352.

The catalytic reaction vessel 354 filled with platinum catalyst receives gaseous hydrogen flown through the hydrogen discharge path 352 and the atmospheric air and makes the air and hydrogen react on the surface of the platinum catalyst to produce water. Although the desirable catalyst is platinum, platinum alloy catalysts including one or two other elements may be used instead, for the purpose of cost reduction and long duration. Examples of such elements added to platinum include ruthenium, nickel, cobalt, palladium, rhodium, iridium, iron, chromium, and vanadium. Instead of filling the reaction vessel with platinum, another possible application carries platinum on ceramic carriers or metal carriers (for example, iron, aluminum). These carriers may have the shape of beads, pellets, discs, balls, or monoliths.

The output of the catalytic reaction vessel 354 is connected to the water tank 43 for feeding water to the gas generator G (identical with the water tank 43 of the first embodiment) via a water feed conduit 356. Water produced by the catalytic reaction vessel 354 is fed to the water tank 43 by means of a pump 358 disposed in the water feed conduit 356. In the course of operation of the stack of fuel cells FC, the materials required for the thermal decomposition are successively supplied to the gas generator G. This reduces the required size of the water tank 43 and the required amount of water reserve. The remaining gas including gaseous hydrogen discharged from the anodes can not be released to the atmosphere without any treatment. The structure of the fifteenth embodiment enables the effective use of the remaining gas and thereby enhances the energy efficiency of the whole fuel cell-based generator system 350.

One modification of this embodiment has a valve disposed in the middle of the hydrogen discharge path 352. The valve is switched to an open position only when the stack of fuel cells FC is at a stop. In general, the released loading and ceased supply of the reaction gas result in an immediate stop of the operation of the stack of fuel cells FC. There is, however, a time lag, before stopping the operation of the gas generator G for producing the gaseous fuel through thermal decomposition. Even after the stack of fuel cells FC is stopped, the gas generator G continues producing gaseous hydrogen. This lowers the energy efficiency of the fuel cell-based generator system. The structure of the fifteenth embodiment, on the other hand, feeds the remaining gas to the catalytic reaction vessel 354 when the stack of fuel cells FC is at a stop. This enables gaseous hydrogen produced by the gas generator G even after a stop of the stack of fuel cells FC to be effectively utilized, thereby enhancing the energy efficiency.

In the above-mentioned embodiment, HI is used as a halohydric acid. This HI may bi replaced with HF, HCL, HBr, etc. Incidentally, those are obtained by a reaction of fluorine, chlorine, bromine and the like with water as well as a catalyst.

Although the present invention has been described and illustrated in detail, it is clearly understood that the same is byway of illustration and example only and is not to be taken by way of limitation, the scope and spirit of the present invention being limited only by the terms of the appended claims.

What is claimed is:

1. A fuel cell-based generator system comprising:
    gas producing means comprising heating means for generating heat; and a reaction tank for reserving a halohydric acid and a catalyst for accelerating decomposition of the halohydric acid, said reaction tank producing the hydrogen-containing reaction gas by thermal decomposition that occurs with the heat from said heating means;

a fuel cell comprising a pair of electrodes with a catalyst carried thereon, to which a supply of the hydrogen-containing reaction gas is fed, said fuel cell generating an electromotive force through an electrochemical reaction of the reaction gas; and a reaction gas supply conduit for feeding the reaction gas produced by said gas producing means to said fuel cell.

2. A fuel cell-based generator system in accordance with claim 1, said fuel-cell-based generator system further comprising:

heat transmission means for transmitting heat generated by said fuel cell to said heating means.

3. A fuel cell-based generator system in accordance with claim 2, wherein said fuel cell is driven at a temperature higher than temperature of the thermal decomposition occurring in said reaction tank, said fuel cell-based generator system further comprising:

a cooling water flow path arranged around said fuel cell, cooling water being passed through said cooling water flow path, said heat transmission means comprising circulation means connected to said cooling water flow path for circulating the cooling water between said cooling water flow path and said heating means.

4. A fuel cell-based generator system in accordance with claim 2, wherein said fuel cell is driven at a temperature lower than temperature of the thermal decomposition occurring in said reaction tank, said heat transmission means comprising temperature increasing means for increasing temperature of the heat generated by said fuel cell to be higher than the temperature of the thermal decomposition.

5. A fuel cell-based generator system in accordance with claim 4, said fuel cell-based generator system further comprising a cooling water flow path arranged around said fuel cell, cooling water being passed through said cooling water flow path, wherein said heat transmission means further comprising:

a first flow path connected to said cooling water flow path for making the cooling water passed to said heating means via said temperature increasing means when said fuel cell is in operation;

a second flow path bypassing said temperature increasing means for making the cooling water passed through said cooling water flow path to said heating means;

detection means for detecting that said fuel cell is at a stop; and control means for, when said detection means detects that said fuel cell is at a stop, deactivating said first flow path and activating said second flow path.

6. A fuel cell-based generator system in accordance with claim 2, wherein said fuel cell is driven at a temperature lower than temperature of the thermal decomposition occurring in said reaction tank, said fuel cell-based generator system further comprising:

a cooling water flow path arranged around said fuel cell, cooling water being passed through said cooling water flow path;

detection means for determining that said fuel cell is at a stop; and feed means for, when said detection means detects that said fuel cell is at a stop, feeding the cooling water through said cooling water flow path to said heating means.

7. A fuel cell-based generator system in accordance with claim 6, said fuel cell-based generator system further comprising:

a reserve tank for reserving a material, from which the halohydric acid reserved in said reaction tank is produced; and means for feeding the cooling water through said cooling water flow path to a periphery of said reserve tank at a time of stopping said fuel cell.

8. A fuel cell-based generator system in accordance with claim 1, said fuel cell-based generator system further comprising:

a reaction gas discharge path for enabling the reaction gas fed to said first electrode of said fuel cell to be discharged from said fuel cell; and closing means for closing said reaction gas discharge path.

9. A fuel cell-based generator system in accordance with claim 1, said fuel cell-based generator system further comprising:

water recovery means for condensing water vapor evolved from said fuel cell by the electrochemical reaction to recover water; and water feed means for feeding the water recovered by said water recovery means as a material for producing the halohydric acid.

10. A fuel cell-based generator system in accordance with claim 1, said fuel cell-based generator system further comprising:

a halogen tank for reserving a halogen;

a water tank for reserving water; and feed means for feeding the halogen and water from said halogen tank and said water tank to said reaction tank, wherein said heating means is arranged in the vicinity of said reaction tank, said gas producing means further comprising:

hydrogen purification means for separating gaseous hydrogen from the hydrogen-containing reaction gas produced by said reaction tank.

11. A fuel cell-based generator system in accordance with claim 10, said fuel cell-based generator system further comprising means for transmitting heat generated by said fuel cell to said halogen tank.

12. A fuel cell-based generator system in accordance with claim 10, said fuel cell-based generator system further comprising means for transmitting heat generated by said fuel cell to said water tank.

13. A fuel cell-based generator system in accordance with claim 10, wherein said gas producing means further comprises oxygen purification means for separating oxygen from the reaction gas produced by said reaction tank, said fuel cell-based generator system further comprising an oxygen supply conduit for feeding the oxygen separated by said oxygen purification means to one of said pair of electrodes of said fuel cell, said second electrode being different from said first electrode that receives a supply of the reaction gas.

14. A fuel cell-based generator system in accordance with claim 13, said fuel cell-based generator system further comprising:

a reaction gas discharge path connected to said fuel cell that receives a supply of the reaction gas from said gas producing means via said reaction gas supply conduit, a remaining portion of the reaction gas consumed by said fuel cell being discharged through said reaction gas discharge path;

an oxygen discharge path connected to said fuel cell that receives a supply of oxygen from said gas producing means via said oxygen supply conduit, a remaining portion of the oxygen consumed by said fuel cell being discharged through said oxygen discharge path;

a first valve member for regulating a gas flow passing through said reaction gas discharge path;

a second valve member for regulating a gas flow passing through said oxygen discharge path;

a first pressure sensor for measuring a gas pressure in said reaction gas discharge path;

a second pressure sensor for measuring a gas pressure in said oxygen discharge path; and control means for regulating valve positions of said first valve member and said second valve member, in order to control the pressure difference between the gas pressure measured by said first pressure sensor and the gas pressure measured by said second pressure sensor to a predetermined value.

15. A fuel cell-based generator system in accordance with claim 10, wherein said hydrogen purification means comprises:

a filtration membrane for allowing selective permeation of hydrogen, said fuel cell-based generator system further comprising:

a reaction gas discharge path connected to said fuel cell that receives a supply of the reaction gas from said gas producing means via said reaction gas supply conduit, a remaining portion of the reaction gas consumed by said fuel cell being discharged through said reaction gas discharge path;

regulating means for regulating a gas flow passing through said reaction gas discharge path;

pressure difference detection means for detecting a pressure difference before and after said filtration membrane; and control means for controlling said regulating means, in order to keep the pressure difference detected by said pressure difference detection means within a predetermined range.

16. A fuel cell-based generator system in accordance with claim 13, said fuel cell-based generator system further comprising:

a reaction gas discharge path connected to said fuel cell that receives a supply of the reaction gas from said gas producing means via said reaction gas supply conduit, a remaining portion of the reaction gas consumed by said fuel cell being discharged through said reaction gas discharge path;

an oxygen discharge path connected to said fuel cell that receives a supply of oxygen from said gas producing means via said oxygen supply conduit, a remaining portion of the oxygen consumed by said fuel cell being discharged through said oxygen discharge path;

a first valve member for regulating a gas flow passing through said reaction gas discharge path;

a second valve member for regulating a gas flow passing through said oxygen discharge path;

a first sensor for measuring a gas flow in a flow path at an outlet of said hydrogen purification means;

a second sensor for measuring a gas flow in a flow path at an outlet of said oxygen purification means; and control means for regulating valve positions of said first valve member and said second valve member, in order to enable a ratio of the gas flow measured by said first sensor to the gas flow measured by said second sensor to coincide with a ratio of hydrogen to oxygen consumed by said fuel cell.

17. A fuel cell-based generator system in accordance with claim 1, said fuel cell-based generator system further comprising:

a reaction gas discharge path connected to said fuel cell that receives a supply of the reaction gas from said gas producing means via said reaction gas supply conduit, a remaining portion of the reaction gas consumed by said fuel cell being discharged through said reaction gas discharge path, wherein said heating means comprises means for combusting the reaction gas discharged through said reaction gas discharge path to generate heat.

18. A fuel cell-based generator system in accordance with claim 1, said fuel cell-based generator system further comprising:

reserve means for reserving the reaction gas produced by said gas producing means, wherein said heating means comprises means for combusting the reaction gas reserved in said reserve means to generate heat.

19. A fuel cell-based generator system in accordance with claim 1, said fuel cell-based generator system further comprising:

reserve means for reserving the reaction gas produced by said gas producing means; and starting-time reaction gas supply means for feeding the reaction gas reserved in said reserve means to said fuel cell through said reaction gas supply conduit at a time of starting operation of said fuel cell.

20. A fuel cell-based generator system in accordance with claim 1, said fuel cell-based generator system further comprising:

water producing means for producing water from a remaining portion of the reaction gas discharged from said fuel cell and an oxygen-containing gas supplied from outside; and water feed means for feeding the water produced by said water producing means as a material for producing the halohydric acid.

21. A method of generating electricity with fuel cells, said method comprising the steps of:

(a) generating heat;

(b) reserving a halohydric acid produced by a reaction of a halogen with water as well as a catalyst for accelerating decomposition of the halohydric acid, and producing a gaseous mixture of hydrogen and another substance by thermal decomposition with the heat generated in said step (a); and (c) feeding gaseous hydrogen included in said gaseous mixture as a reaction gas to an electrode with a catalyst carried thereon, and generating an electromotive force through an electrochemical reaction of the reaction gas.

22. A method in accordance with claim 21, wherein said step (b) is carried out by using heat generated by the electrochemical reaction in said step (c).

* * * * *